United States Patent [19]

Shimizu et al.

[11] Patent Number: 5,546,208
[45] Date of Patent: Aug. 13, 1996

[54] ELECTROOPTICAL DEVICE INVOLVING A MIXTURE OF LIQUID CRYSTAL, PHOTO CURABLE RESINS AND REACTION INITIATING MATERIAL FOR FORMING RESINOUS COLUMNS

[75] Inventors: Michio Shimizu; Toshimitsu Konuma; Kouji Moriya, all of Kanagawa, Japan

[73] Assignee: Semiconductor Energy Laboratory Co., Ltd., Kanagawa-ken, Japan

[21] Appl. No.: 198,277

[22] Filed: Feb. 18, 1994

[30] Foreign Application Priority Data

| Feb. 19, 1993 | [JP] | Japan | 5-055237 |
| Mar. 26, 1993 | [JP] | Japan | 5-092606 |
| Apr. 13, 1993 | [JP] | Japan | 5-110071 |

[51] Int. Cl.$^6$ ............ G02F 1/1335; G02F 1/13; G02F 1/1337; G02F 1/1339
[52] U.S. Cl. ............ 359/81; 359/48; 359/52; 359/75
[58] Field of Search .............. 359/48, 52, 75, 359/81, 51

[56] References Cited

U.S. PATENT DOCUMENTS

| 4,673,255 | 6/1987 | West et al. . | |
| 4,775,225 | 10/1988 | Tsuboyama et al. | 359/81 |
| 4,791,418 | 12/1988 | Kawahara et al. | 359/48 |
| 4,924,243 | 5/1990 | Sato et al. | 359/81 |
| 4,950,052 | 8/1990 | Fergason et al. . | |
| 5,150,231 | 9/1992 | Iwamoto et al. . | |
| 5,189,540 | 2/1993 | Nakamura et al. . | |
| 5,204,763 | 4/1993 | Hikmet . | |
| 5,268,782 | 12/1993 | Wenz et al. | 359/81 |
| 5,268,783 | 12/1993 | Yoshinaga et al. . | |
| 5,305,126 | 4/1994 | Kobayashi et al. . | |
| 5,321,533 | 6/1994 | Kumar . | |
| 5,327,271 | 7/1994 | Takeuchi et al. . | |
| 5,333,074 | 7/1994 | Hikmet . | |
| 5,357,356 | 10/1994 | Konuma et al. | 359/52 |
| 5,381,256 | 1/1995 | Hanya et al. | 359/75 |
| 5,387,445 | 2/1995 | Horiuchi et al. | 359/80 |

FOREIGN PATENT DOCUMENTS

| 58-33218 | 2/1983 | Japan . | |
| 1-265231 | 10/1989 | Japan . | |
| 0139522 | 5/1990 | Japan | 359/73 |
| 3-246521 | 11/1991 | Japan . | |
| 4-40415 | 2/1992 | Japan . | |

Primary Examiner—William L. Sikes
Attorney, Agent, or Firm—Sixbey, Friedman, Leedom & Ferguson, P.C.; Gerald J. Ferguson, Jr.; Jeffrey L. Costellia

[57] ABSTRACT

A liquid crystal electrooptical device having: a pair of light-transmitting substrates assembled in such a manner that their surfaces having an electrode thereon may face against each other; a liquid crystal material charged between said pair of substrates; and an orienting means on the inner surface of at least one of the substrates to obtain one-direction oriented liquid crystal; thereby allowing the uncured resin to precipitate inside said liquid crystal material and allowing it to solidify into a column to adhere said orienting means or said substrate with the cured resin. A process for fabricating the same device is also disclosed.

25 Claims, 27 Drawing Sheets

ELECTROOPTICAL DEVICE INVOLVING A MIXTURE OF LIQUID CRYSTAL, PHOTO CURABLE RESINS AND REACTION INITIATING MATERIAL FOR FORMING RESINOUS COLUMNS

BACKGROUND OF THE INVENTION

1. Field of the Invention

The present invention relates to a liquid crystal electro optical device and a method for forming the same. Particularly, the present invention relates to a liquid crystal electrooptical device, and particularly, to a structure which is capable of maintaining a constant distance between the substrates (inter-electrode spacing) of a large area liquid crystal electrooptical device.

2. Prior Art

As a conventional liquid crystal electro optic device, TN type or STN type one utilizing nematic liquid crystal is widely known and is put to practical use. Recently, one utilizing ferroelectric liquid crystal is also known. Such liquid crystal electro optic device comprises: a pair of substrates faced with each other, with one substrate having an electrode on its surface and the second substrate having an electrode on its surface; a liquid crystal layer holding a liquid crystal material between these substrates; and utilizes electro optic effect caused by change of condition of liquid crystal molecules, said change caused by voltage applied to said liquid crystal layer, by anisotropy of dielectric constant of the liquid crystal material itself, or by intrinsic polarization in the case of utilizing antiferroelectric liquid crystal.

In the liquid crystal electro optic device of TN or STN type, liquid crystal molecules are arranged in the direction of rubbing on the interface between the substrates and the liquid crystal layer, caused by the force of rubbing performed for orientation treatment. In the substrates upside and downside, the directions of rubbing are crossed by 90°, or 200° to 290°. As a result, liquid crystal molecules around the middle of the liquid crystal layer are arranged spirally, making energy the smallest between molecules upside and downside placed by 90° to 290°. In this case, a kiral material is included in a liquid crystal material of STN liquid crystal if necessary.

In the liquid crystal electro optic device of TN or STN type above mentioned, the liquid crystal molecules arranged spirally unfasten this spiral structure by being arranged in parallel or vertically to the direction of field, by dielectric anisotropy of the liquid crystal molecules caused by voltage applied to both substrates. The device shows bright state when the liquid crystal molecules are arranged vertical to the substrate, and dark state when the liquid crystal molecules are arranged in parallel. The conditions of the liquid crystal molecules change continuously by changing voltage applied between the substrates. Therefore gradation display can be made by appropriately controlling voltage applied.

In the liquid crystal electro optic device utilizing ferroelectric liquid crystal or antiferroelectric liquid crystal, liquid crystal molecules are arranged in accordance with the force controlled by rubbing treatment, at least on one side of the substrate. These liquid crystal molecules have a layer structure in which layers are regularly deposited one after another, from one side of the substrate to the other side of the substrate.

In above mentioned liquid crystal electro optic device utilizing ferroelectric liquid crystal or antiferroelectric liquid crystal, the liquid crystal molecules which are arranged in parallel to the substrate in a layer structure change the direction of intrinsic polarization by 180°, which the liquid crystal molecules themselves have (hereinafter called as inversion). This inversion is caused by applying voltage between both substrates. The device changes the direction of the liquid crystal molecules which are arranged along the rubbing direction to some degree, by the inversion of the liquid crystal molecules. Thus switching is performed from bright state to dark state, or from dark state to bright state.

In what is called active matrix type liquid crystal electro optic device, further improved display with high speed, high brightness, and many gradations is performed. An active matrix electro optic liquid crystal device comprises a plurality of pixels on one side of the substrates holding a liquid crystal material and switching devices connected to each pixel, such as diode and thin film transistor (TFT).

A general structure of cell of above mentioned liquid crystal electro optic device is explained by FIG. 1. What is described is a device of simple matrix type. Electrode patterns 1102 and 1103 are formed on translucent substrates 1100 and 1101 such as glass or resin. A means of orientation 1104 and 1105 are formed on the electrodes to arrange the liquid crystal in one direction. The spacer 1107 distributed on the substrate keeps the minimum distance between the substrates. A seal material fixes the two substrates. A liquid crystal material 1106 is implanted between the substrates, thus forming a liquid crystal layer.

When a polyimide film subjected to rubbing treatment is used as a means to establish the molecular orientation, horizontally oriented liquid crystal molecules arranged along one direction, either in parallel with or making a predetermined angle with respect to the surface of the substrate, can be obtained. When a silane coupling agent is used, on the other hand, perpendicularly oriented liquid crystal molecules can be found to be arranged along a direction vertical to the surface of the substrate. The molecular orientation of the liquid crystal, which is either perpendicular or horizontal, depends on the desired mode of operation.

A voltage is applied to the liquid crystals by the electrodes 1102 and 1103. The liquid crystal molecules arrange themselves in correspondence with the electric field which is generated as a consequence of the applied voltage to provide a light state and a dark state. A uniform display can be obtained by maintaining a constant distance between the electrodes, and moreover, the two substrates must be placed at a constant distance. Though the distance between the electrodes differs depending on the operation mode, however, it is generally in the range of from 1.2 to 20 μm with a precision of 0.05 μm or less.

Recently, a large-area display is getting demanded for a liquid crystal electro optic device. Efforts have been made to embody a huge liquid crystal display with diagonal distance as long as 40 inches.

Though the size of the display is enlarged in this case, a distance demanded between substrates is as very short as 1.2 to 20 μm as above mentioned. Accuracy of the display is also demanded as 0.05 μm or less.

The weight of above mentioned display with 40-inch diagonal distance will be over 8 kg, just by facing glass substrates of 120 cm and 1.1 mm thickness. If the distance between the substrates is 6 μm, the weight of liquid crystal put between the substrates amounts to 60 g. With such a large size, even though strong glass substrates are used, the substrates are wound like paper by the cause of their own weight, when the substrates are just held vertically.

Thus, it follows that a liquid crystal cell obtained by allowing the facing two substrates to stand straight upward undergoes deformation to yield a pear-like shape. Then, the distance between the electrodes at the lower portion of the cells increases to about several times to several tens of times, and, in extreme cases, several hundred times as large as that of the upper portion, thereby making it impossible to realize a uniform display due to the failure of generating a constant applied electric field.

In the case of a ferroelectric liquid crystal, moreover, the liquid crystal molecules are oriented as such to form a layered structure. Accordingly, the deformation of a substrate destroys the layered structure to impart a fatal damage to the liquid crystal, thereby making it unfeasible to make a display. This phenomenon is readily encountered in small displays having a display area as small as about 5 $cm^2$, and it has been known as a serious problem in ferroelectric liquid crystal displays.

As described referring to FIG. 1 above, a conventional cell comprises a sealing material to fix the two substrates with a constant spacing. Since the inner portions are supported only by the spacers, it is quite natural that a severe deformation form more frequently with increasing distance from the sealed portions.

As a means to overcome the aforementioned problems of cell deformation, it has been proposed to adhere the two substrates by not only placing an adhesive at the peripheral sealing portions, but also scattering adhesive grains inside the cell. However, on the other hand, the adhesive grains caused disordering in the molecular orientation.

What decides the condition of liquid crystal molecules between substrates is mainly the strength of voltage applied to electrodes of both substrates. Impurities with charge from the liquid crystal or orientation films may exist, and unneeded charge producing voltage in opposite direction to the voltage applied may be produced in the device of the prior art, which problem is widely known.

This charge moves in the liquid crystal layer held between both substrates freely, by the cause of voltage applied. Most of this charge moves and reaches the surface of the orientation film, but charge will not move further because the orientation film is essentially insulative. Thus charge is accumulated between the orientation film and the liquid crystal layer (at the interface between the orientation film and liquid crystal).

This charge produces undesirable problem as a liquid crystal electro optic device. For example, effect to eliminate voltage applied between both substrate is made. In turning the liquid crystal molecules in an opposite direction enough, it is necessary to make the applied voltage bigger than the voltage needed in reversing intrinsic polarization. In applying voltage between the electrodes, the state of liquid crystal molecules is not stabilized because the amount of charge in the liquid crystal layer changes with passage of time. Moreover, the liquid crystal molecules electrically absorbed by the cause of charge accumulated at the interface between the orientation film and the liquid crystal in changing its state needs a voltage bigger than that of liquid crystal molecules which are not absorbed and in the liquid crystal layer. Therefore the liquid crystal molecules in the liquid crystal layer will not cause change of state at a time. This causes a problem that character of translucency of light is not stabilized, said character being the most important in the character of liquid crystal electro optic device.

To solve this problem, there is a method to select material for an orientation film relaxing accumulation of charge or a method to orient liquid crystal molecules by depositing $SiO_2$ and the like on the electrode diagonally, instead of selecting an orientation film being an insulating film. However, these are not a common method because they are time-consuming for many preparative experiments, which results in high cost, and because effect may change by combination of materials. There is also a method of removing impurities by purifying the liquid crystal. However, this method is far from desirable when considering mass productivity because liquid crystal that can be used by purification is very little.

There is also a method to make charge of + or − as ±0 by absorbing or combining charge existing in the liquid crystal layer by the use of charge transfer complex. (Hereinafter called as cancel or neutralize) However, it is difficult to measure and take in charge transfer complex of an appropriate amount in canceling charge perfectly. If charge transfer complex in the liquid crystal layer is not enough, undesirable charge cannot be canceled. Excess charge transfer complex will move in the liquid crystal layer like above mentioned charge does, and causes defects.

As above mentioned, there are various kinds of methods suggested to cancel charge existing in a liquid crystal layer, said charge causing change of voltage applied to the liquid crystal layer, that is, causing change of condition of liquid crystal molecules with passage of time and making optical characteristic of the device unstable. However, a method which can cancel charge easily and perfectly has not existed yet.

The present invention is aimed at solving various kinds of problems as above mentioned. That is, the present invention provides a liquid crystal electro optic device which can make substrates adhered to each other without disordering orientation condition of the liquid crystal material, and manufacturing method thereof. The present invention is aimed at removing effects caused by undesirable charge in the liquid crystal layer to stabilize optic characteristic of the device, and is aimed at providing a high quality liquid crystal electro optic device without flicker or change in tone.

SUMMARY OF THE INVENTION

In the light of the circumstances described in the foregoing, the present invention provides a liquid crystal electrooptical device which comprises a pair of light-transmitting substrates faced against each other and each having an electrode thereon, a liquid crystal material charged between said pair of substrates, and an orienting means on the inner surface of at least one of the substrates to obtain one-direction oriented liquid crystal, thereby allowing the unsolidified resin to precipitate inside said liquid crystal material and allowing it to solidify into a column to adhere said orienting means or said substrate with the solidified resin.

In the liquid crystal electro optic device of the present invention, a pair of substrates having electrodes on their surfaces are provided face to face with each other, with the sides of said electrodes inside. A liquid crystal material is held between said pair of substrates. A means of orientation to orient said liquid crystal material in one direction is provided inside on at least one of said substrate of said pair of substrates. The liquid crystal electro optic device is characterized in that a hardened resin component and a reaction starter is held in said liquid crystal material.

The liquid crystal electro optic device comprises the following:

a pair of substrates having electrodes on their surfaces and provided with the sides of said electrodes inside;

a liquid crystal material held between said pair of substrates;

a means of orientation to orient said liquid crystal material in one direction provided inside on at least one of said substrate of said pair of substrates;

said liquid crystal material including a reaction starter.

The liquid crystal electro optic device of the present invention comprises:

a pair of substrates having electrodes on each of their surfaces, said electrodes disposed face to face with each other;

a liquid crystal material held between said pair of substrates;

a reaction starter existing in said liquid crystal material.

The present invention is a method of manufacturing a liquid crystal comprising at least the steps of:

filling a liquid crystal compound comprising a liquid crystal material, a resin component, and a reaction starter between a pair of substrates faced with each other, said substrates having electrodes on inside surfaces and having an orientation film on at least one inside surface;

separating said liquid crystal material and said resin component from one another in said liquid crystal compound;

cleaving said reaction starter.

The present invention is a method of manufacturing a liquid crystal electro optic device comprising at least the steps of:

filling a liquid crystal compound comprising a liquid crystal material and a reaction starter between a pair of substrates faced with each other and having electrodes on their inside surfaces;

cleaving said reaction starter.

The present invention is characterized in that:

a resin material which is not hardened yet and which comprises a resin component (monomer or oligomer) and a reaction starter is added in a liquid crystal material and forms a liquid crystal compound;

said liquid crystal compound is held between substrates of a liquid crystal electro optic device;

said resin is hardened between the substrates;

thus a distance is fixed between the substrates without disarranging orientation of the liquid crystal, and removing undesirable charge in the liquid crystal layer.

The basic structure of the liquid crystal electro optic device of the present invention is explained by FIG. 4. Orientation films 104 and 105 are formed on at least one of translucent substrates 102 and 10B which have electrode and lead 100 and 101 and polarizing plates 112 and 113, as a means of orienting liquid crystal. To keep the space between the substrates equal, a silica bead 108, for example, is utilized as a spacer. Both substrates are fixed with a seal material 107. The device comprises a resin 108 in the shape of a column adhering the substrates, a resin lump 109 and a liquid crystal 110 held between the substrates, and a reaction starter 111 dispersed in these resin and liquid crystal.

In the liquid crystal electro optic device, the reaction starter having been added during formation is dispersed homogeneously in the liquid crystal compound. Even if said resin component is separated and deposited in the liquid crystal material from the liquid crystal compound under a room temperature, said reaction starter is left dispersed in the liquid crystal compound. Even if the reaction starter is cleaved and the resin component is hardened, the reaction starter exists in the liquid crystal material left. The resin component is hardened and becomes columnar structure, and exists as a resin lump (resin solid) to adhere substrates of up side and down side with a surface of the orientation film and the like. The resin component also exists as a resin lump (resin solid) in the liquid crystal layer. The columnar resin is referred to as a PCS (polymerized column spacer) in the present invention.

A liquid crystal material, a resin component, and a reaction starter are mixed to manufacture this liquid crystal electro optic device. They are heated and stirred so that the liquid crystal and the resin would be mixed well, until the liquid crystal would indicate isotropy. Then the liquid crystal compound is provided between substrates of said device. When the temperature of the device is cooled gradually from the temperature at which the liquid crystal compound indicates isotropy, the resin component mixed in the liquid crystal compound is eliminated and scattered in the device. Though the reaction starter is also dispersed in the liquid crystal material, the dispersed reaction starter will lower the temperature of the device but will not be extinguished from the liquid crystal material. Therefore the reaction starter in the liquid crystal device exists both in the part of the resin component and in the part of the liquid crystal material.

Just in removing undesirable charge without forming a resin in the shape of column, it is possible to have a reaction starter only mixed in the liquid crystal material, without using a resin component.

It is desirable to heat and stir said liquid crystal compound until the temperature at which the liquid crystal material indicates isotropy. If this is gradually cooled until the liquid crystal material indicates liquid crystal phase, the resin component would be separated so that it will be eliminated from the liquid crystal material.

When ultraviolet light is irradiated to this device, the reaction starter in the device is cleaved and generates charge. A part of this charge from the reaction starter contributes to hardening of the resin. A part of this charge will cancel excessive charge in the device directly.

If the area of the hardened resin occupied by the display portion of the liquid crystal electro optic device is 0.1 to 20%, enough display characteristic and stability of the whole device as a liquid crystal electro optic device can be obtained.

What is called resin component (resin which has not been hardened yet) usually on the market is a resin component added with a reaction starter. This resin component can be mixed into a liquid crystal material to form a liquid crystal compound; otherwise, the amount of reaction starter to be added in the resin component can be changed; or the resin component and the starter can be divided from one another to mix them into the resin component in separate, in forming said liquid crystal compound.

Above mentioned reaction starter can be mixed in the liquid crystal material beforehand; can be mixed in the material of the orientation film as a means of orientation; can be painted on the orientation film. That is, the reaction starter 111 can be mixed in said orientation films 104 and 105, or can be painted on the surface of them.

As a reaction starter, a reaction starter of ultraviolet enhancing cleavage type is the most appropriate. In this case, after the cleavage of the reaction starter, polarizing plates 112 and 113 are provided on the substrates 102 and 103.

The amount of addition of the reaction starter can be changed at random in accordance with the cleanliness level of the substrate and purity level of the liquid crystal material.

As a standard, addition of 0.001 to 10% to the liquid crystal material, preferably 0.1 to 3% is effective to solve problem above mentioned.

In the present invention, a resin component is separated and deposited from a mixture of a liquid crystal material and unhardened resin (resin component (monomer or oligomer) and reaction starter) between substrates, and a liquid crystal material is oriented. After that, a reaction starter is cleaved and a resin is hardened in the shape of column. By adhering it with both substrates, the distance between the substrates is fixed.

The mixture of the liquid crystal material and the uncured resin at high temperatures is uniform between the substrates, because it is in an isotropic phase in which the uncured resin cannot be distinguished from the liquid crystal. However, when the temperature is lowered to about the room temperature, the uncured resin is discharged from the liquid crystal material to provide precipitates scattered between the substrates. Thus, by applying a means of curing the resin at this stage, the scattered resin can be brought together into a columnar shape to adhere the both substrates with each other.

A liquid crystal material having a further improved molecular orientation can be obtained by heating the mixture of the liquid crystal material and the uncured resin to such a temperature at which an anisotropic state is achieved, and then gradually cooling it to a temperature at which a liquid crystal phase is achieved. Gradual cooling is effective in the case of using a liquid crystal material containing a smectic phase with a particularly high ordering, because a superior molecular orientation can be realized. Furthermore, the uncured resin can be separated and precipitated from the mixture during this step. Subsequently, the thus separated and precipitated resin is cured in the solidification step.

It can be seen therefore that the present invention comprises curing the resin after arranging the liquid crystal material in accordance with the means for imparting molecular arrangement, and that it therefore can maintain the liquid crystal molecules in a favorable molecular orientation of the initial state before curing the resin. In this manner, it can be seen that the favorable molecular orientation can be maintained without being impaired because the initial molecular arrangement is fixed as it is by curing the resin.

The orientation of a liquid crystal material containing from 0.1 to 20% of resin in a mixture containing a liquid crystal material and an unsolidified resin is approximately the same as that in a cell containing solely a liquid crystal material. It can be seen that the influence of the mixed resin can be neglected.

The area of the resin portion cured into a column shape as viewed from the substrate side of the device accounts for about 0.1 to 20% of that of the entire display portion. The area fraction is about the same as that of the fraction of the unsolidified resin within the mixture. In other words, it can be safely said that most of the unsolidified resin is cured. Accordingly, the rest, i.e., the area of the liquid crystal material accounts for 80 to 99.9%. The amount of resin to be mixed in the mixture can be adjusted in accordance with the force designed to adhere the two substrates with each other. As a matter of course, the strength of the liquid crystal cell itself is increased, that is, the force for maintaining a constant substrate distance becomes strong, as the area fraction of the cured resin is increased. However, the area of a part of the cell through which light transmits is decreased to lower the electro-optical characteristics such as contrast. The above range is preferable in order to make the strength and the electro-optical characteristics compatible with each other.

The resin to be used in the process according to the present invention is preferably such which exhibits a mixed state with a liquid crystal material at high temperatures, but which undergoes separation and precipitation at lower temperatures. Furthermore, it is particularly desirable that the unsolidified resin contains no solvent, because the resin is to be cured between the two substrates. Since the formation of molecular orientation in a liquid crystal material and the separation of the resin from the liquid crystal material greatly depends on the temperature, the resin is preferably solidified by a means which is indifferent to the temperature. By taking the aforementioned factors into consideration, it can be seen that most preferred is to use a UV-curable resin as the unsolidified resin, and that UV is used as a means for curing the resin.

The inventors of the present invention found that undesirable charge existing in the liquid crystal layer which makes the condition of liquid crystal molecules unstable can be canceled by hardening the resin in the liquid crystal layer, or by cleaving the reaction starter. By the methods like these, transfer of charge and accumulation of charge at the interface of orientation film and the liquid crystal, which had been problems, will be solved. Therefore, change of condition of the liquid crystal molecules and control of optic characteristic will be easily performed because voltage between both substrates (electrodes) holding a liquid crystal layer will not change with passage of time, and because undesirable change of condition of the liquid crystal molecules will not happen. Moreover, more stable optic characteristic will be obtained because liquid crystal molecules to be absorbed to the substrates will be lost and the whole liquid crystal layer will change its condition by applied voltage.

The procedure to cancel undesirable charge in the liquid crystal layer is considered to be as the following. That is, firstly, said undesirable charge is canceled by taking it into the resin when the resin material is hardened. Secondly, said undesirable charge is canceled by making it absorbed or connected to the reaction starter dispersed in the liquid crystal material.

Said first method utilizes reaction when ultraviolet hardening resin is hardened. That is, "hardening" of said ultraviolet hardening resin is a procedure of polymerization reaction when monomer and oligomer of said resin component is enhanced and cleaved to produce charge, said charge being used as a starter of polymerization reaction. Heat, especially light with shorter wavelength than that of visible light, such as ultraviolet light is applied as energy to the reaction starter to generate charge. During this polymerization reaction, reactivity of side chain portion of monomer and oligomer will also increase (hereinafter called as active). To take in said charge in the resin is, in other words, to make said active side chain portion and undesirable charge existing in the device react with each other. Because usually the hardened resin will not be decomposed easily, the charge taken in will not move again in the liquid crystal layer.

In said second method, the reaction starter dispersed in the liquid crystal material after gradual cooling generates charge enough to cancel undesirable charge by positive radiation of ultraviolet light during resin hardening. The excessive charge generated more than needed in canceling undesirable charge in said second method will recombine with themselves and become stable.

Therefore, even if solely reaction starter is mixed in a liquid crystal material without using resin component, undesirable charge itself existing in the liquid crystal electro optic device can be canceled.

Generation rate of charge by said first and second methods is as the following: usually one or more, generally two or more charge for one reaction starter; one ore more from one monomer molecule; one or more, generally two or more from one oligomer molecule.

The reaction starter can cleave naturally, but is easy to generate charge by enhancement and cleaving, by giving heat or light with shorter wavelength than that of visible light, for example, ultraviolet light. Because the generated charge has high reactivity, it can easily react with other charge in existence. If there is no charge else, charge will react with another cleaved charge of itself and becomes stable.

It cannot be directly confirmed if undesirable charge is canceled by looking at it. In general, this can be regarded as a change of current value with passage of time after voltage is applied to the device for a specified period, or as a change in electric current when applied voltage is changed in succession.

Chopping waves of ±30 V and 5 Hz are applied between the electrodes in the liquid crystal electro optic device of the present invention in FIG. 4, and measured result of current value according to change of voltage is shown in FIG. 5. As is shown in FIG. 5, nothing is confirmed but current peak (hereinafter called as Ps peak) caused by inversion of intrinsic polarization in the direction of plus and minus of current in the liquid crystal electro optic device of the present invention. Because undesirable charge exists in the liquid crystal layer in a conventional liquid crystal electro optic device, another peak (hereinafter called as the second peak) other than Ps peak in FIG. 5 is generated like in FIG. 7. This second peak indicates excessive current caused by undesirable charge. The bigger the second peak is, the more unstable the condition of the liquid crystal molecules were. The liquid crystal electro optic device of the present invention generated this second peak little, and condition of the liquid crystal molecules was very stable.

As a material of a substrate, glass and polyethylene terephthalate (PET) is utilized as a material of a substrate, and a polarizing plate and a phase contrast plate mainly comprising polyvinyl alcohol (PVA) and polycarbonate is utilized to make use of uniaxiality of liquid crystal molecules and polarization associated with it. Sometimes such polarizing plate and a phase contrast plate iS mixed with ultraviolet absorbent, or an ultraviolet absorbing filter is added to the device. Such glass, polarizing plate, phase contrast plate, ultraviolet absorbent, or ultraviolet absorbing filter as this positively absorbs light with wavelength less than that of visible light. Little amount of light with wavelength less than that of visible light will reach the liquid crystal material and the resin during the normal device operation, and unnecessary cleavage of reaction starter will not happen after the device is completed.

If the reaction starter added to the liquid crystal cleaves by natural and cancels the charge that causes undesirable change of condition of the liquid crystal molecules existing in the device, after that, stable condition will be obtained without cleavage.

If said charge causing undesirable change of condition of the liquid crystal molecules existing in the device cannot be canceled completely just with the charge by natural cleavage of the reaction starter, charge needed in canceling said charge can be provided by positively adding energy, such as radiation of ultraviolet light. Excessive charge from the reaction starter generated more than that necessary in canceling recombinates with itself and becomes in stable condition.

It is anticipated that the liquid crystal material would be deteriorated if the reaction starter is added to the liquid crystal material. In the present invention, however, no deterioration of the liquid crystal material was seen.

In the embodiments according to the present invention, liquid crystals operating on various types of modes can be used; there can be employed, for example, a TN type liquid crystal comprising molecules being oriented along a direction twisted at an angle of 90° between the two substrates, an STN type liquid crystal comprising molecules in a twisted orientation with an angle of from 180° to 270°, an STN type liquid crystal comprising liquid crystal molecules further tilted with respect to the surface of the substrate at a pre-tilt angle of from 3° to 10°, a type using nematic liquid crystal having a negative dielectric anisotropy and to which a perpendicular orientation treatment is applied to achieve the molecular orientation, and those using smectic liquid crystals.

Thus, as described in the foregoing, the present invention provides a liquid crystal device which comprises a cell equipped with substrates dispersed therebetween resin portions, thereby adhering the substrates at a constant spacing without impairing the molecular orientation of the liquid crystal material. Accordingly, the present invention makes it possible to maintain a constant spacing between the electrodes even in large area liquid crystal cells.

In the present invention, unneeded change of condition of liquid crystal molecules caused by charge inside a device, which had been a problem of a conventional liquid crystal electro optic device, is solved by positively canceling the charge itself existing in the device by the charge from a reaction starter.

The present invention also embodied optical stability in the long run, because excessive charge to be canceled will not be produced, which had been a problem by the use of charge transfer complex before.

A display is realized by optical rotatory power or birefringence in the liquid crystal electro-optical device of the present invention.

BRIEF DESCRIPTION OF THE DRAWINGS

FIG. 8 shows an optical characteristics of a liquid crystal electro-optical device according to a comparative example described in Embodiment 4 obtained by pulse voltage application;

11

Figure 9:
Figure 9:
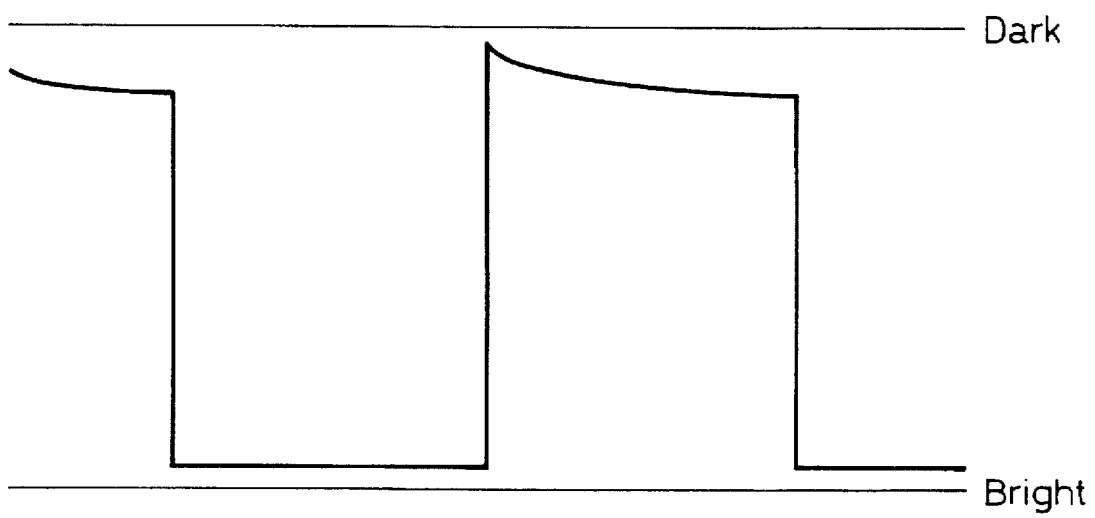
Figure 10:
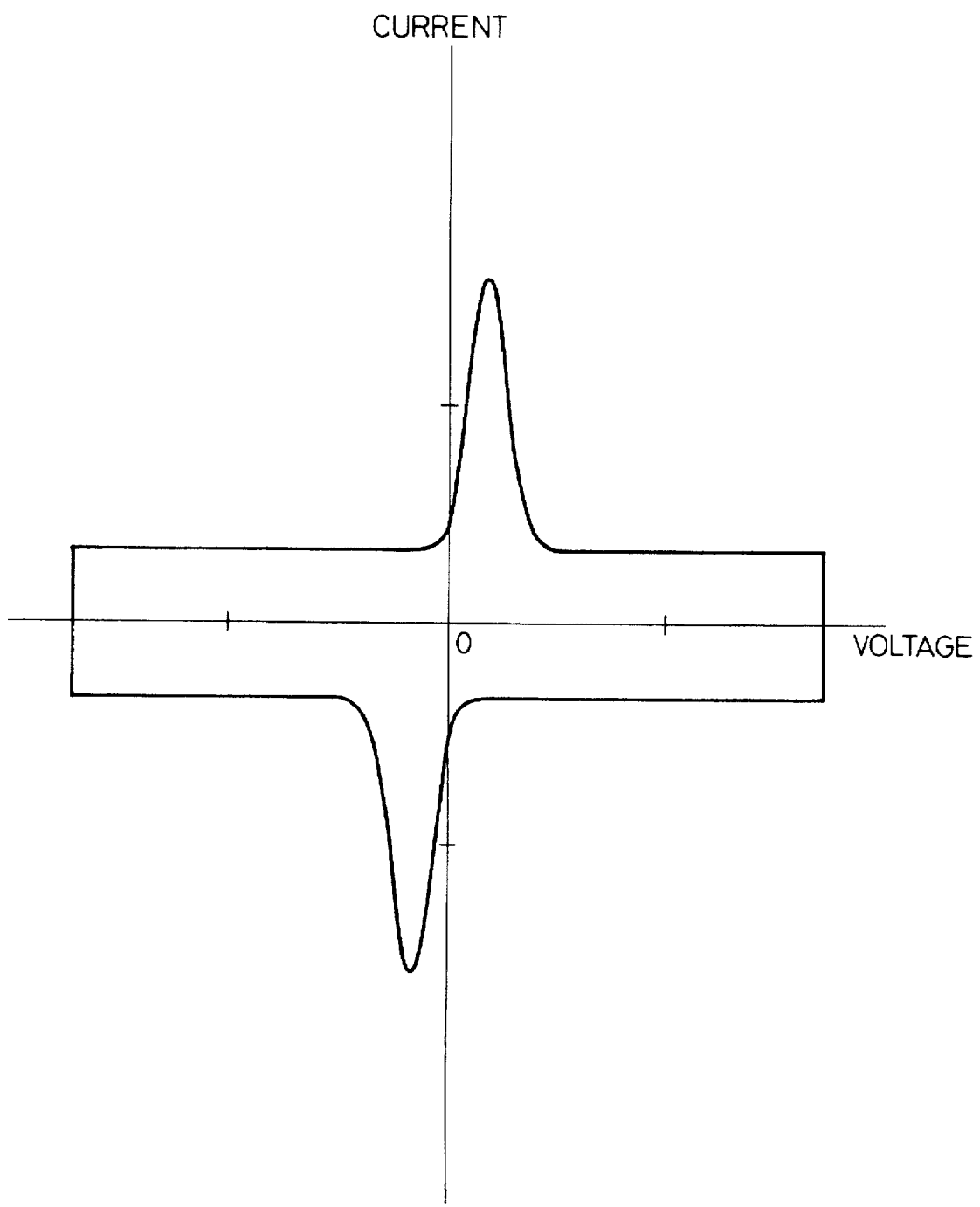
Figure 11:
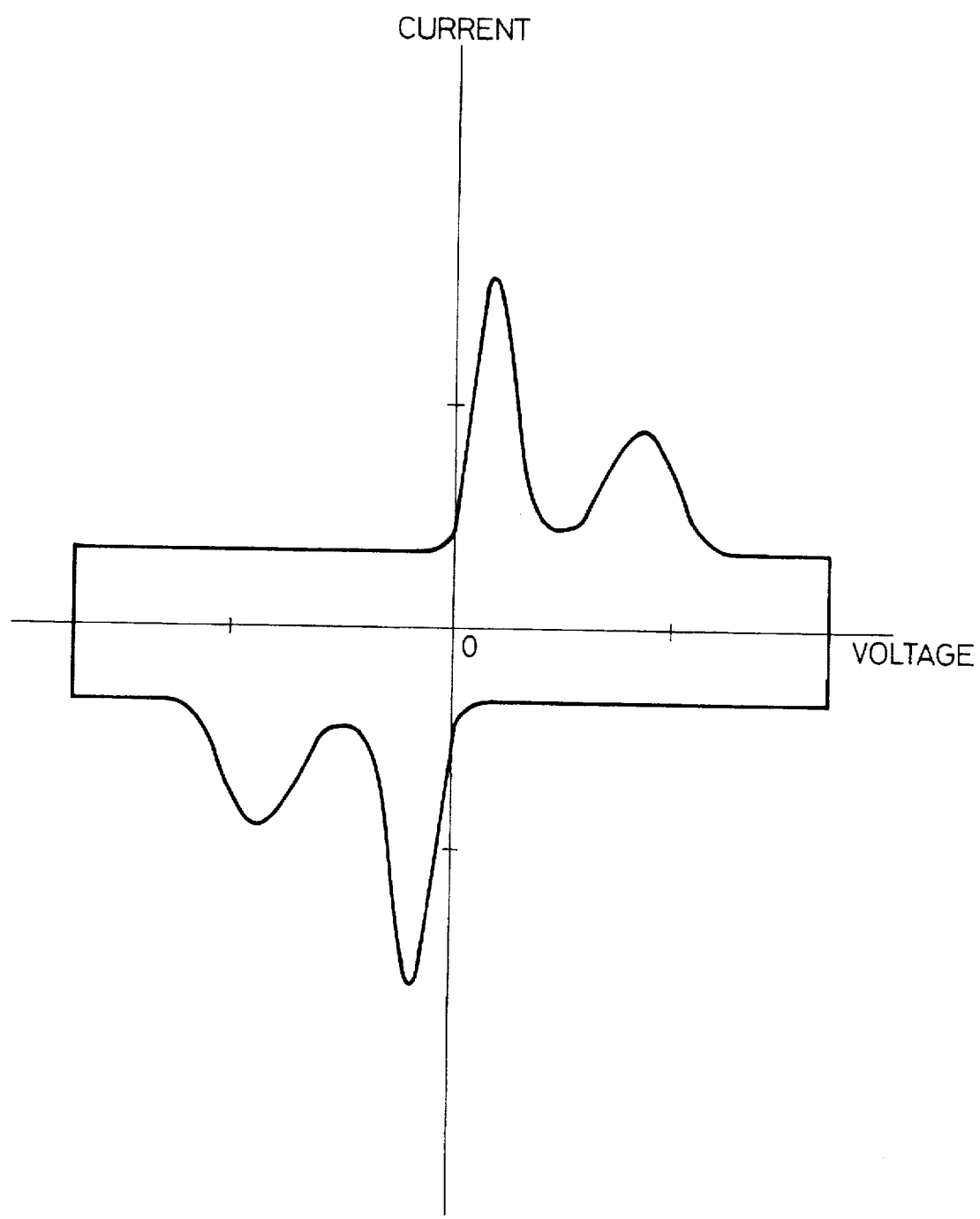
Figure 12:
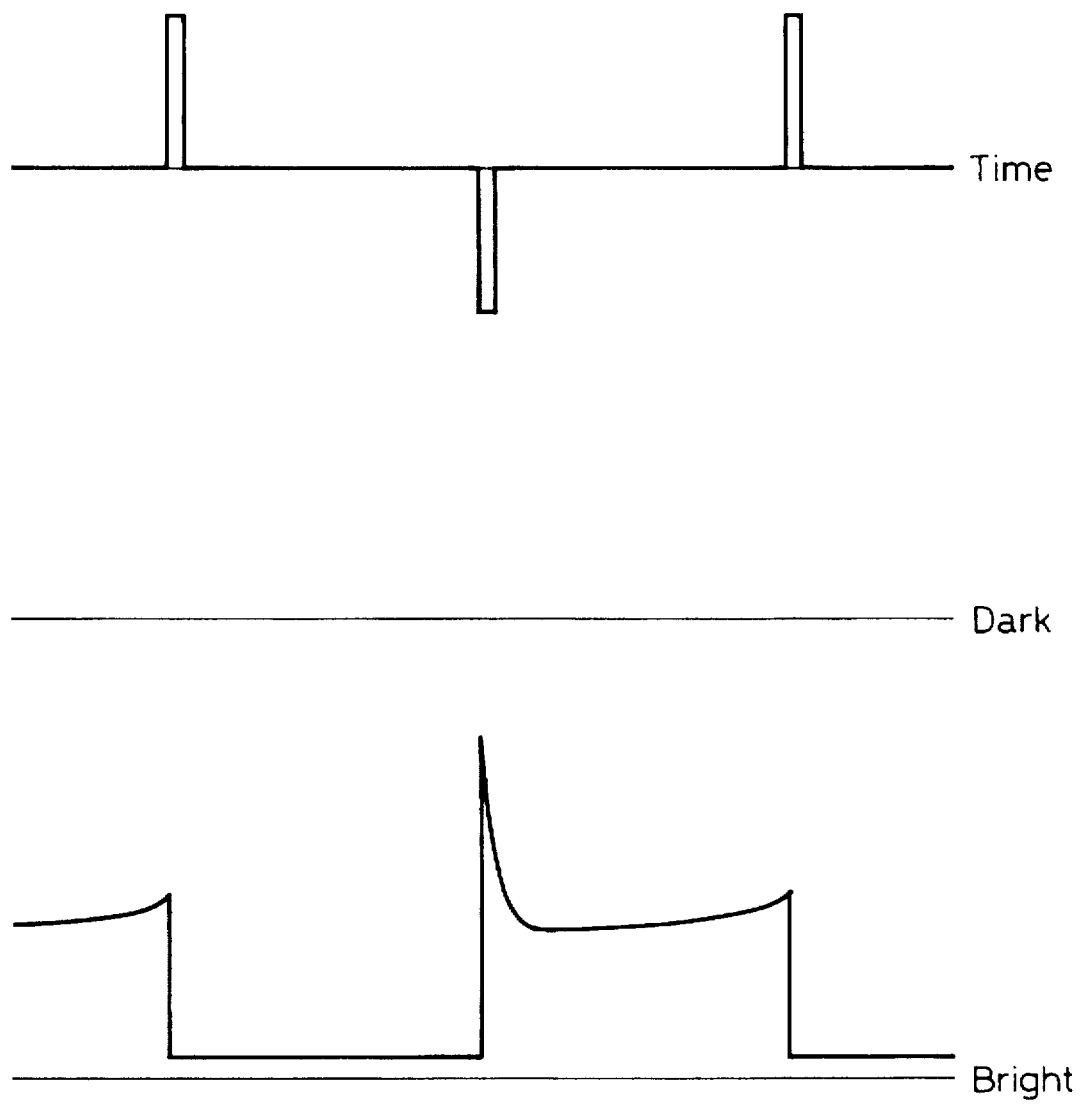
Figure 13:
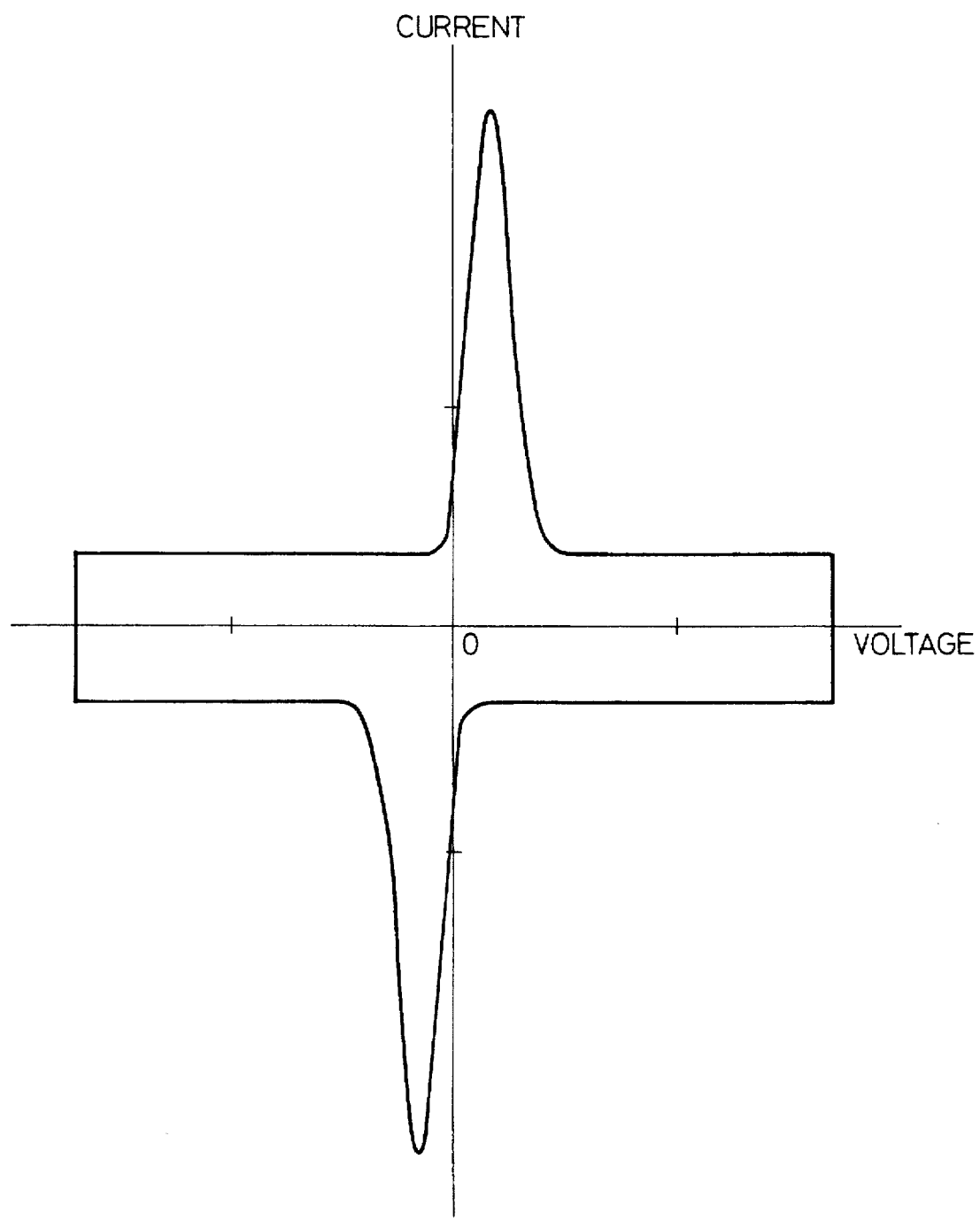
Figure 14:
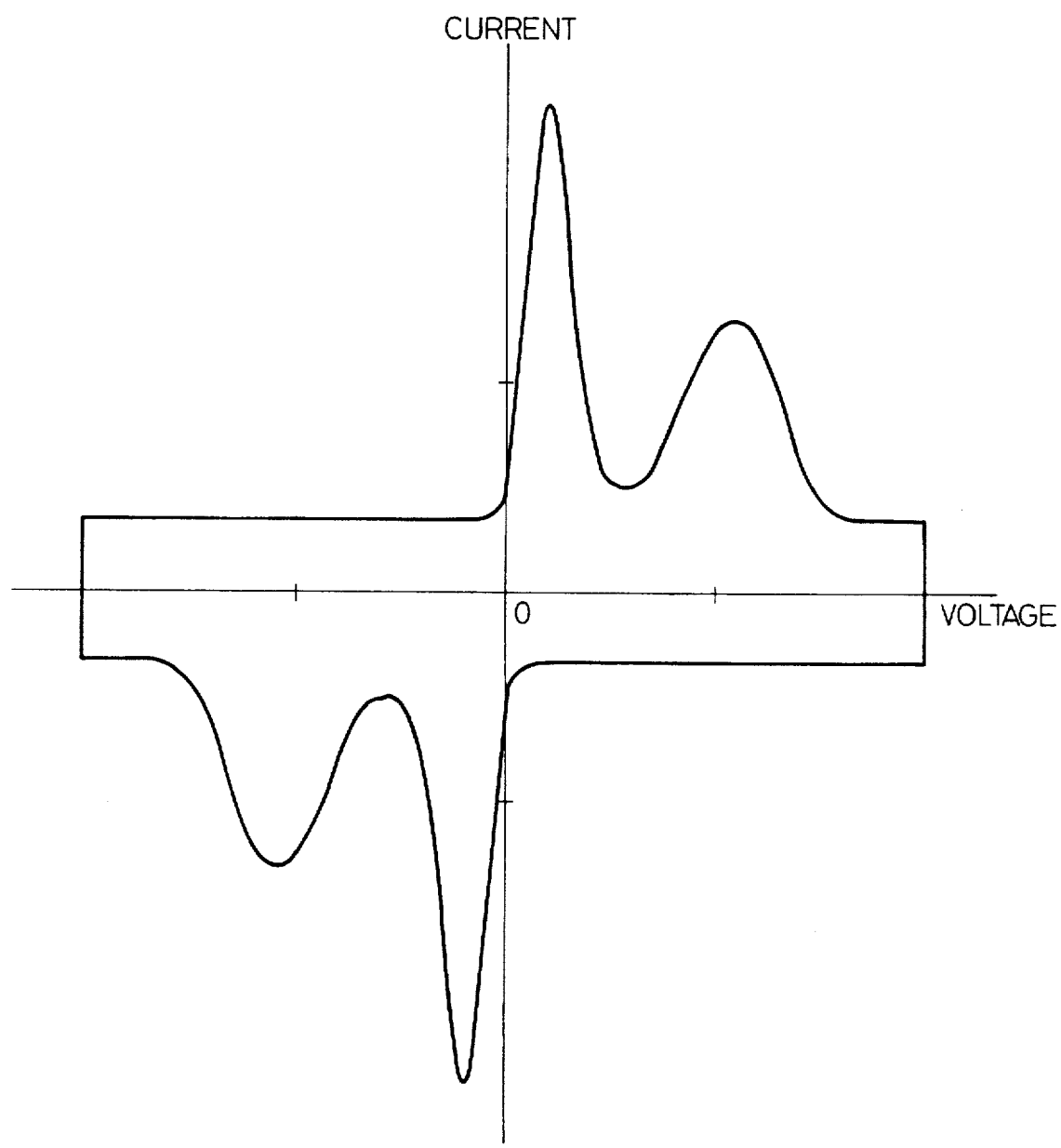
Figure 15:
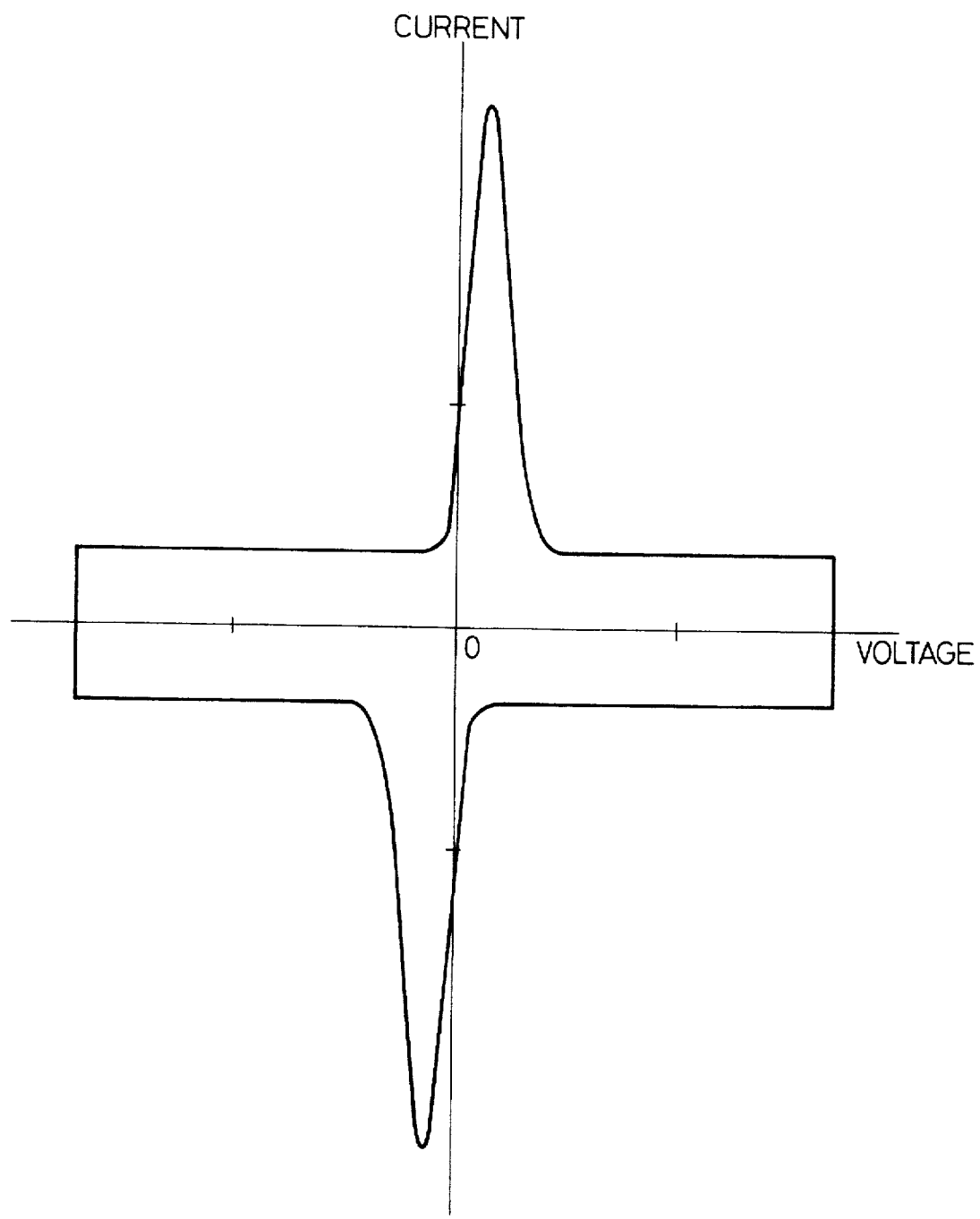
Figure 17:
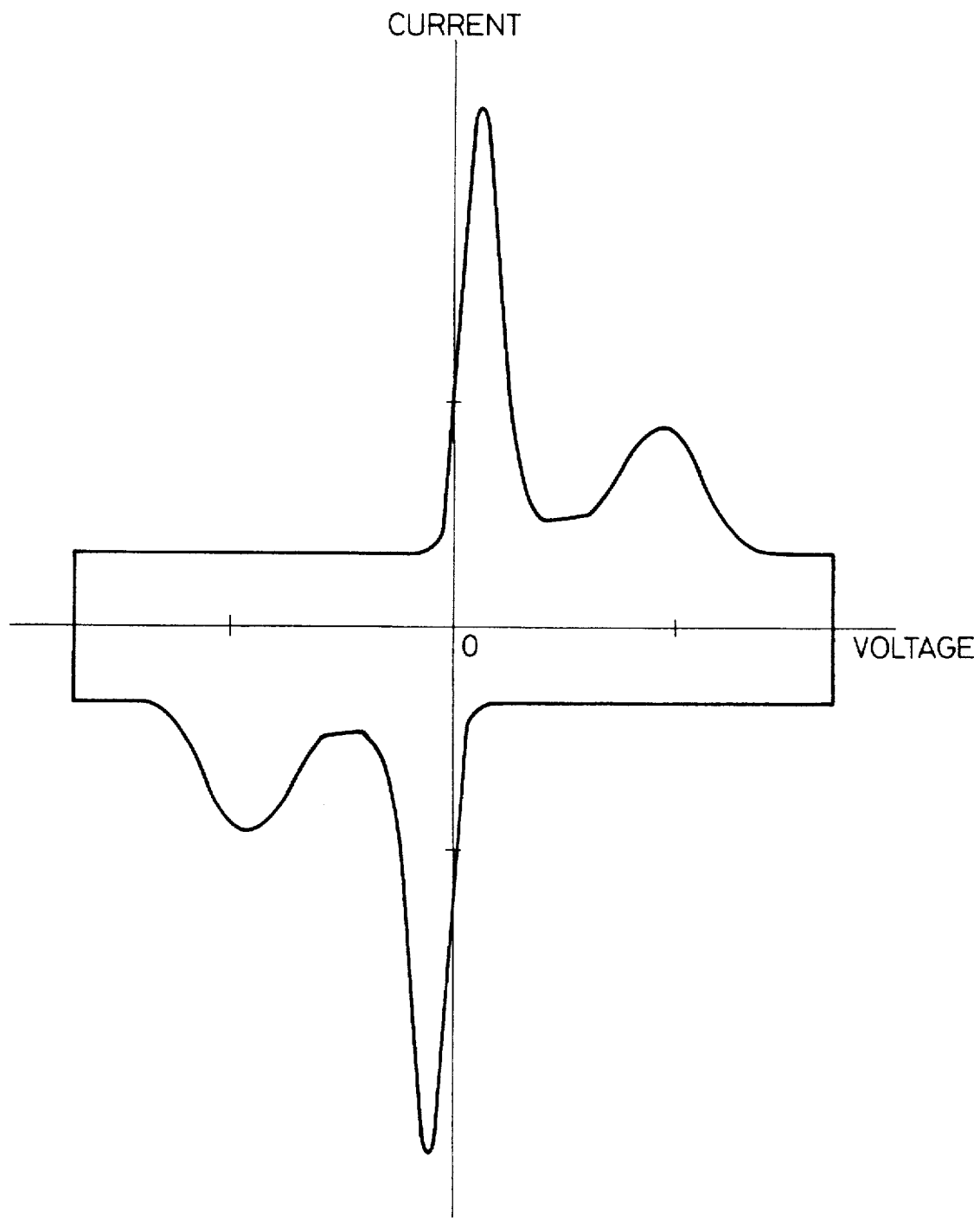
Figure 18:
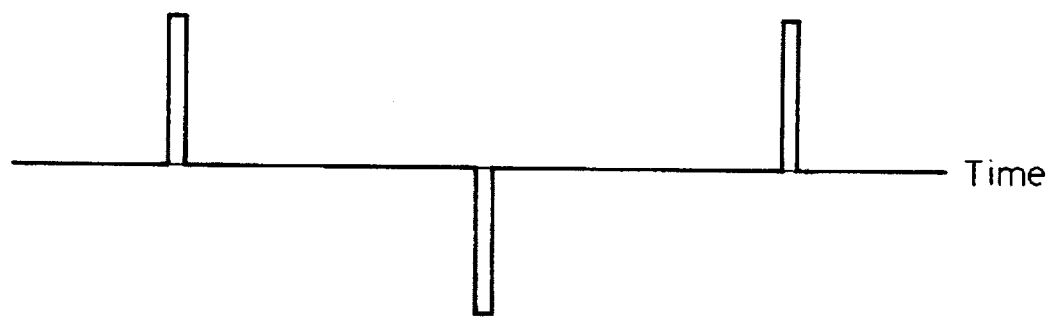
Figure 18:
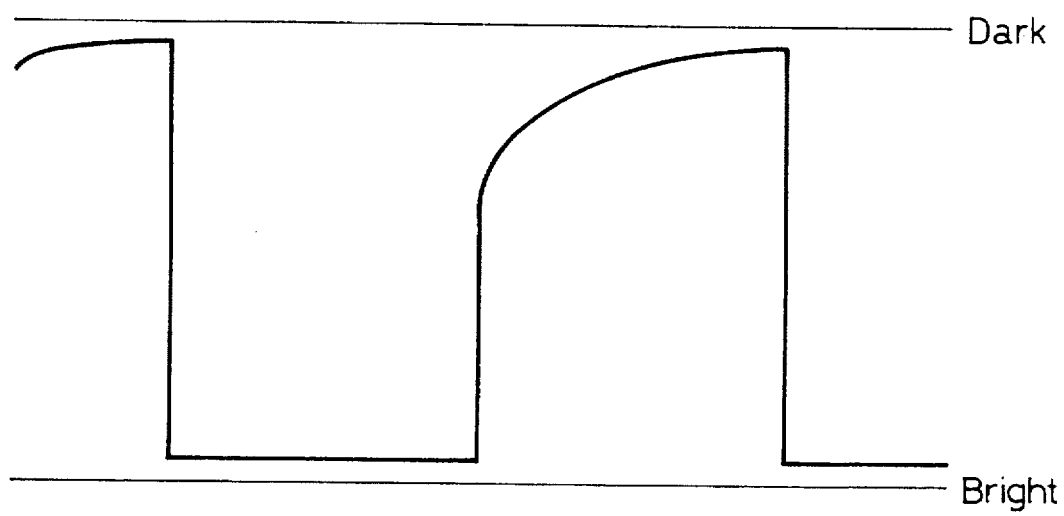
Figure 19:
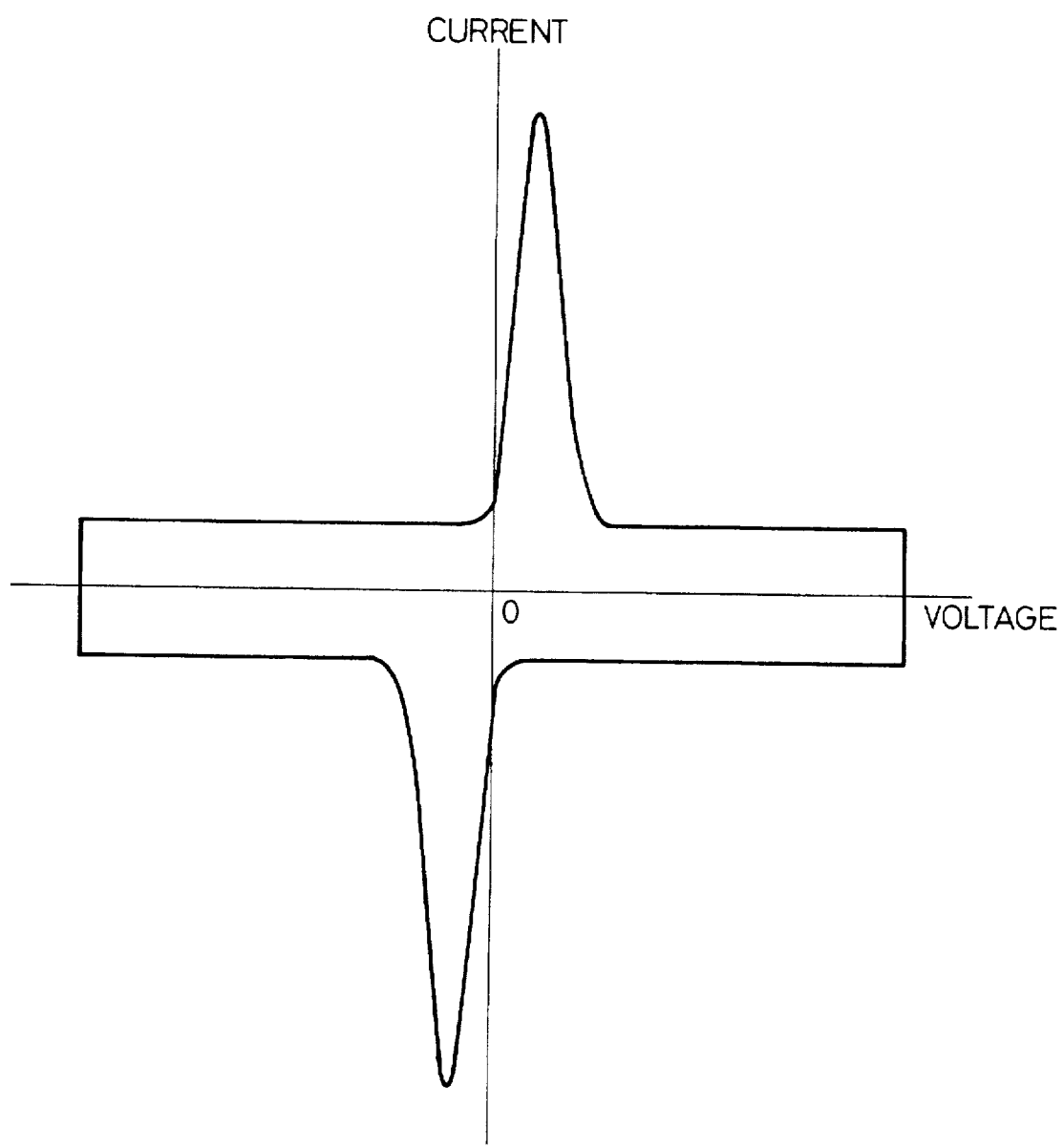
Figure 20:
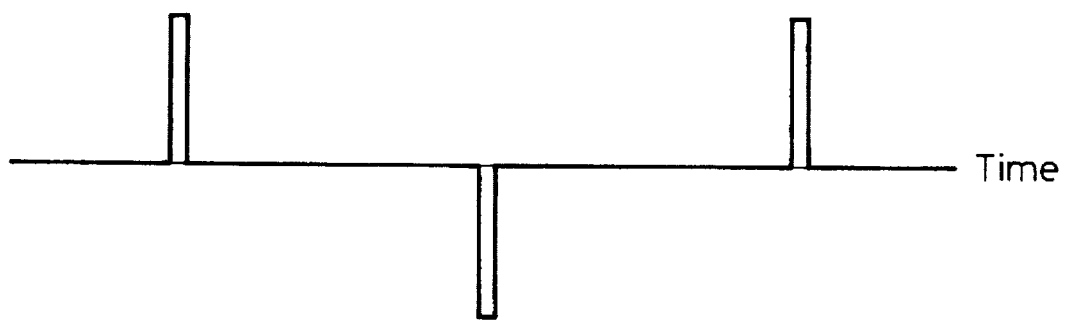
Figure 20:
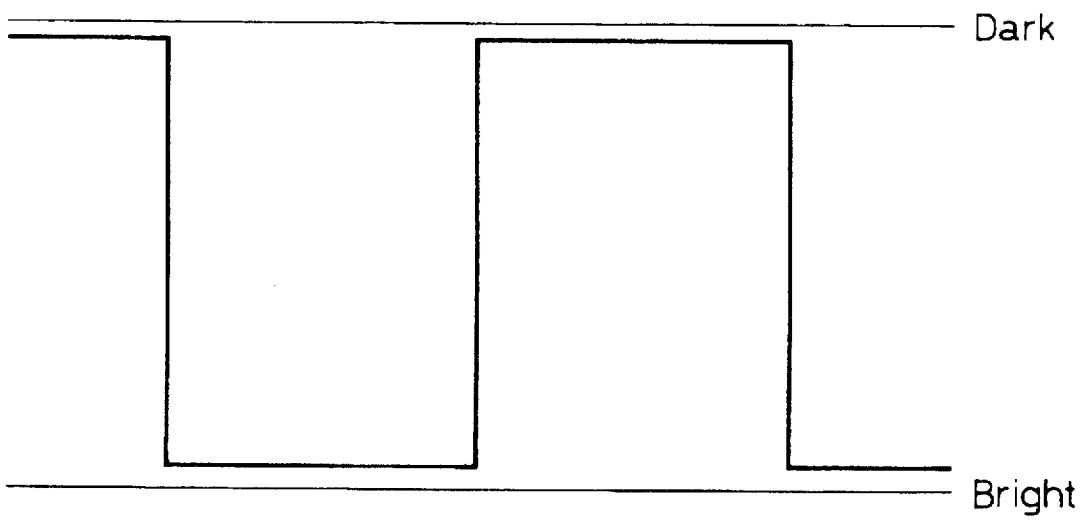
Figure 21:
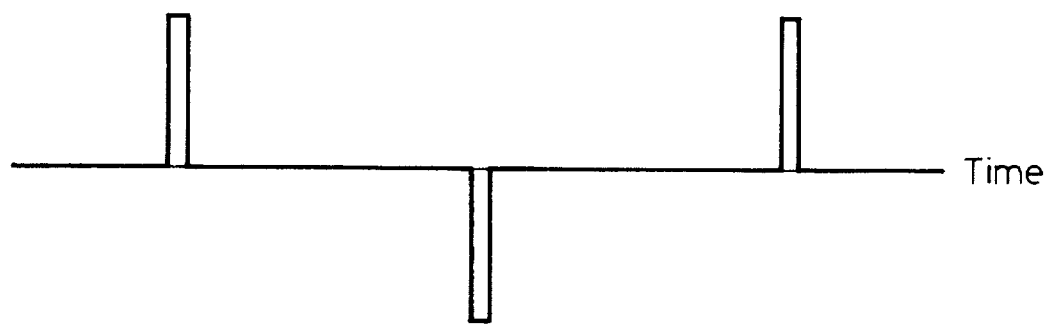
Figure 21:
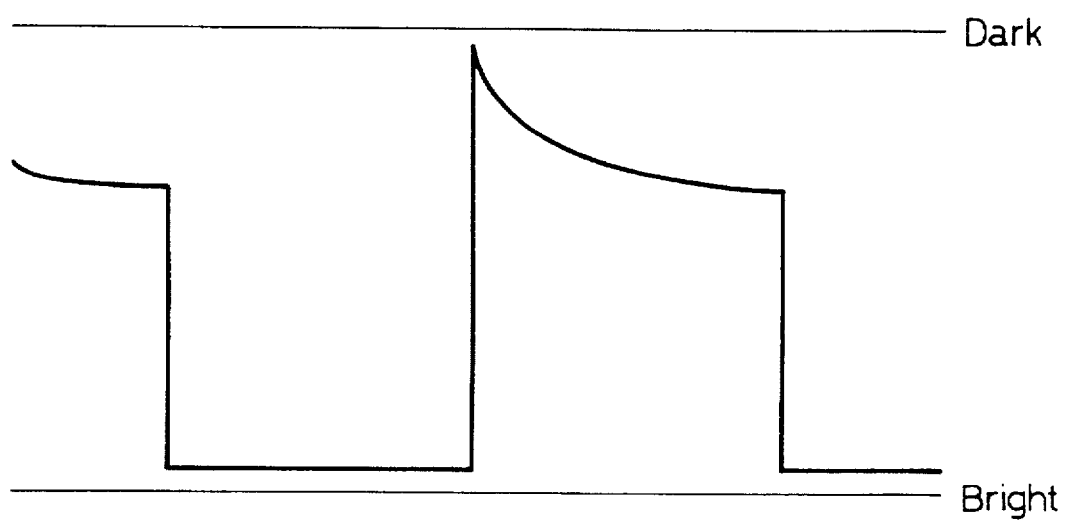
Figure 22:
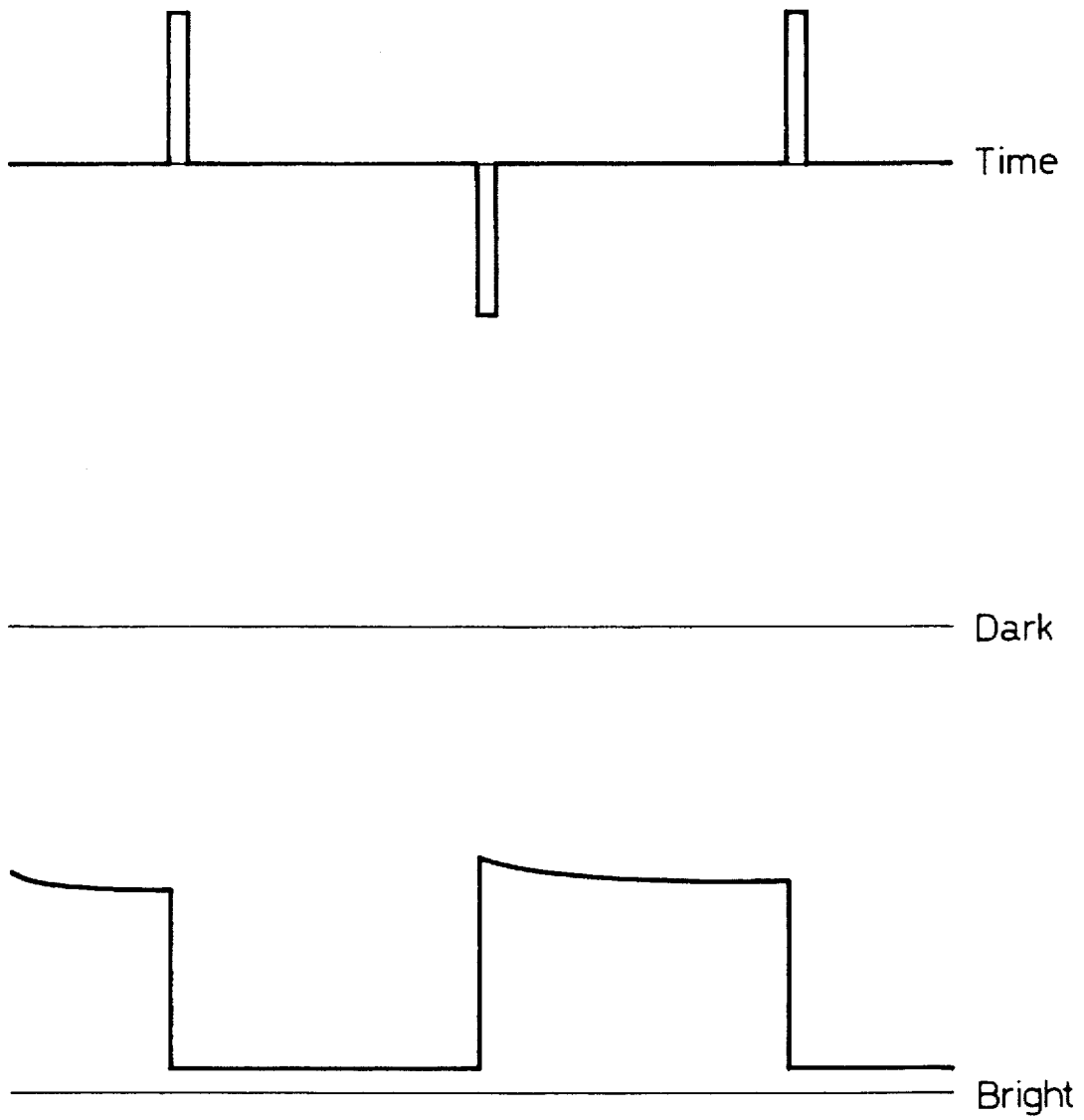
Figure 23:
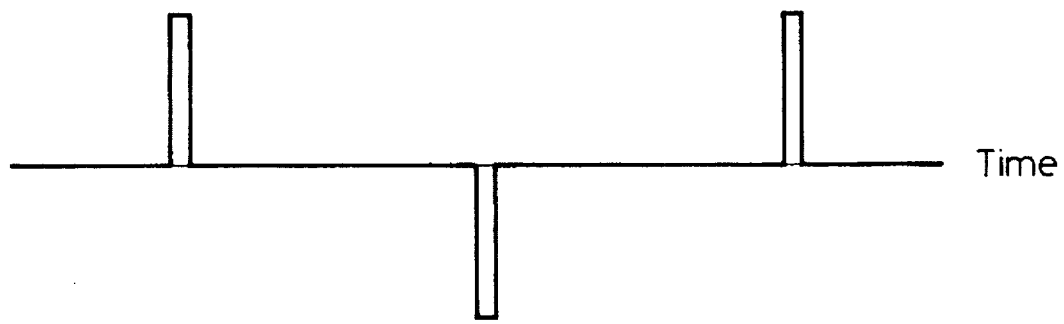
Figure 23:
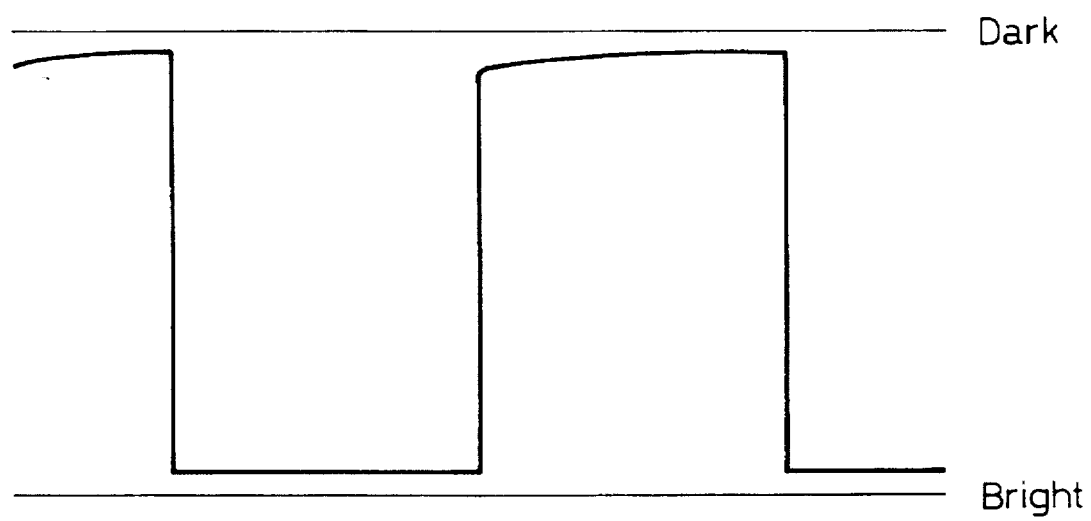
Figure 24:
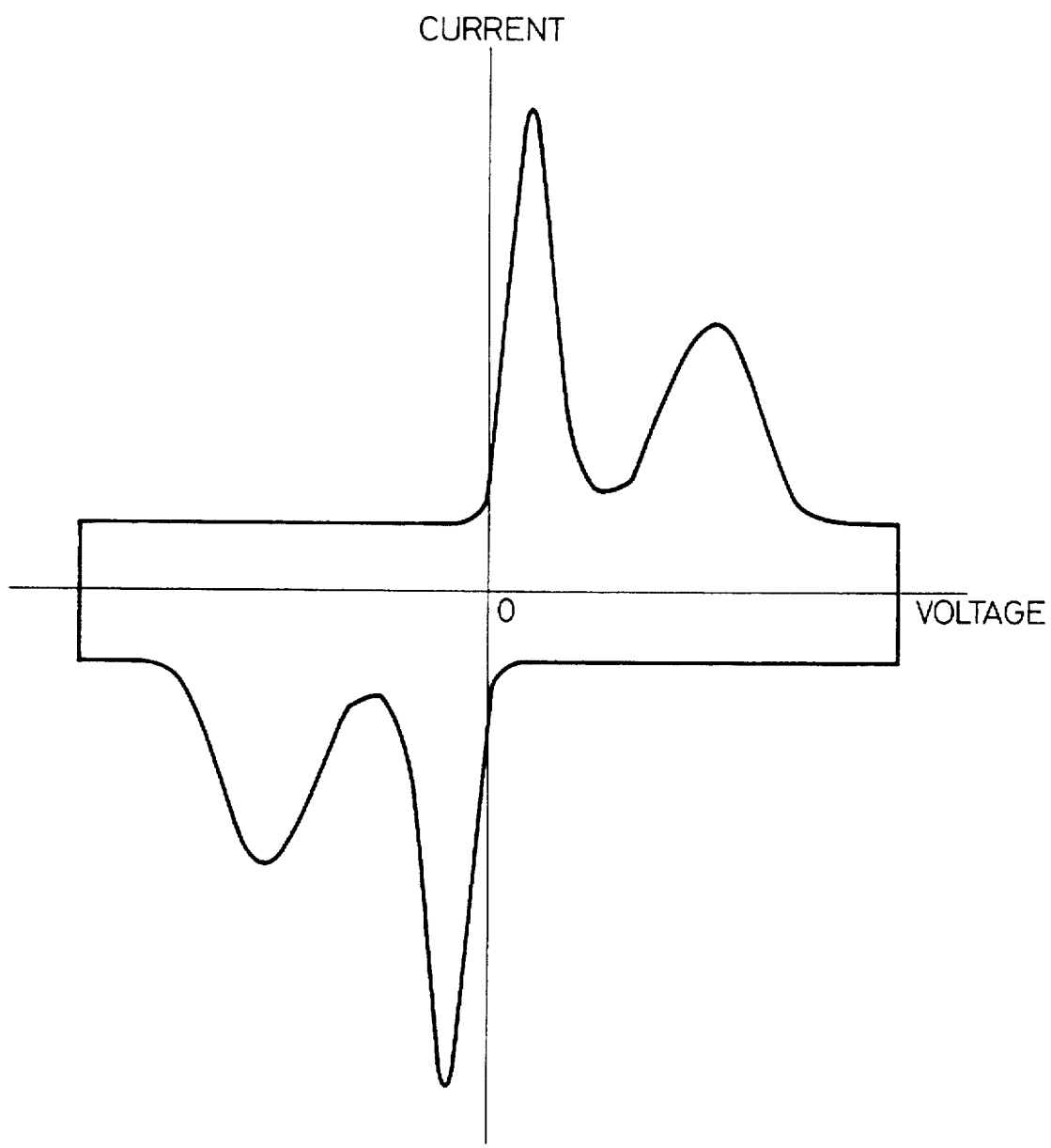
Figure 25:
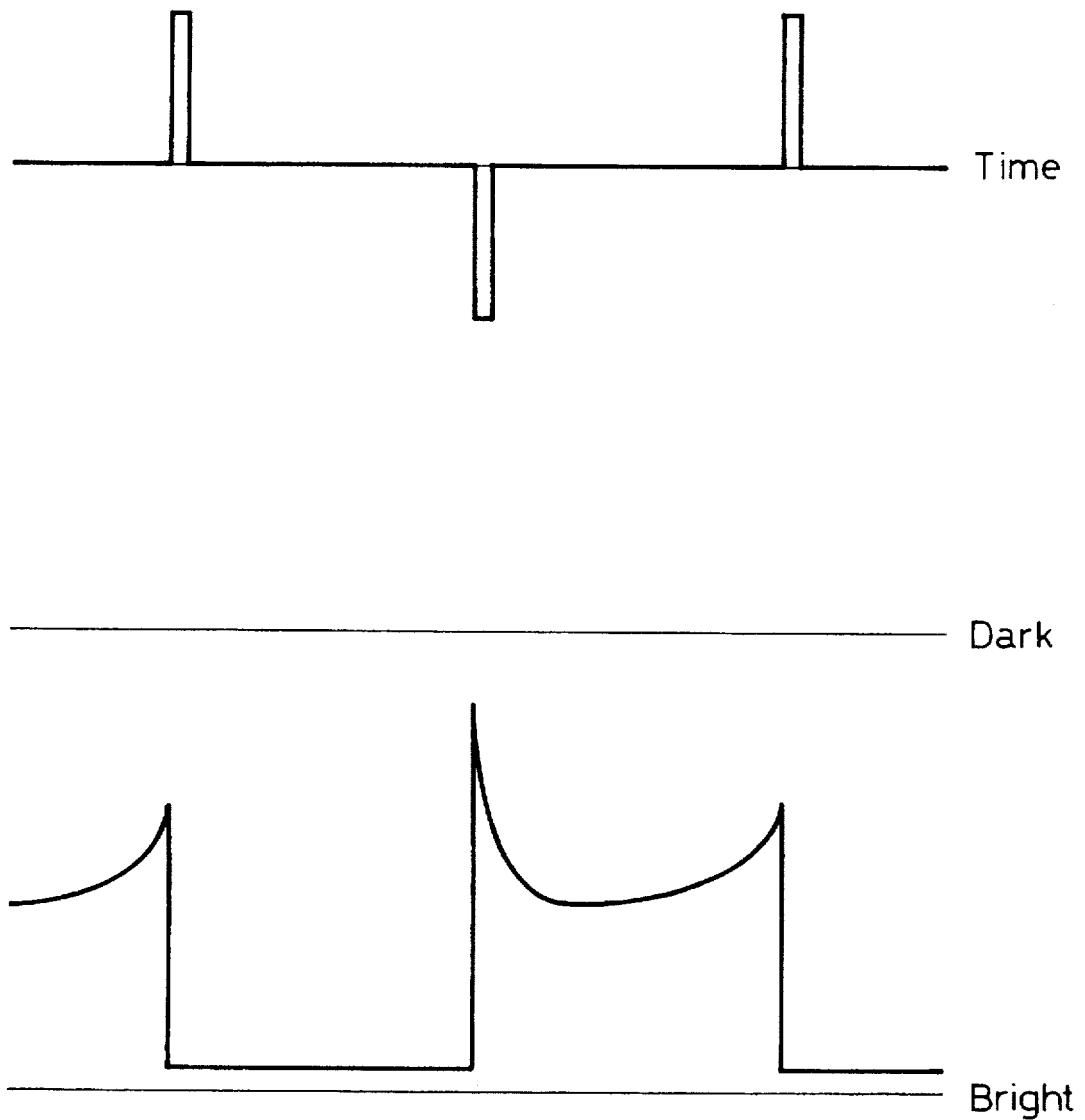
Figure 26:
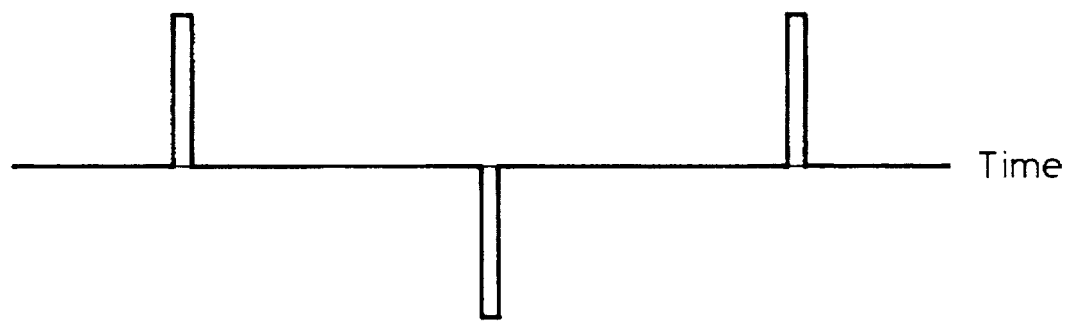
Figure 26:
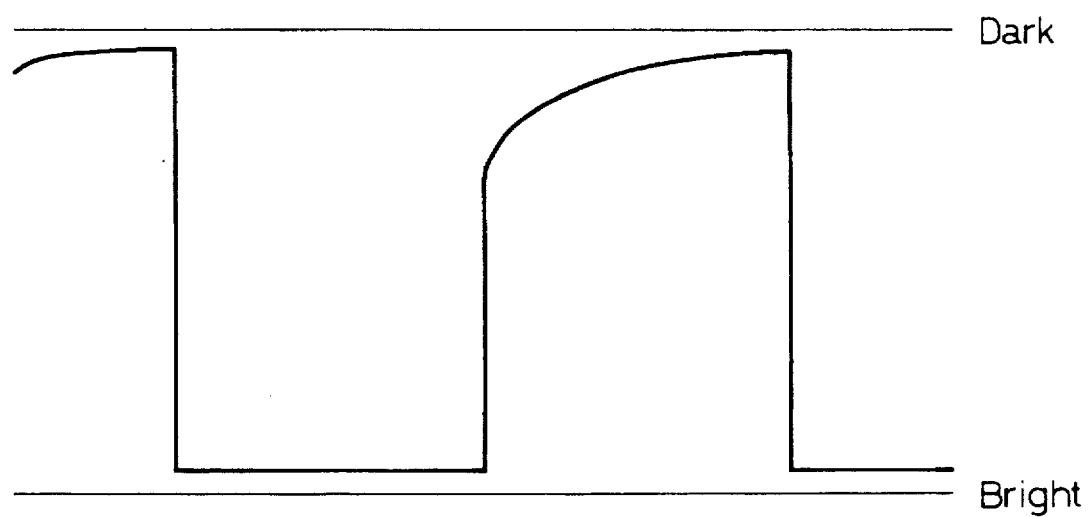
Figure 27:
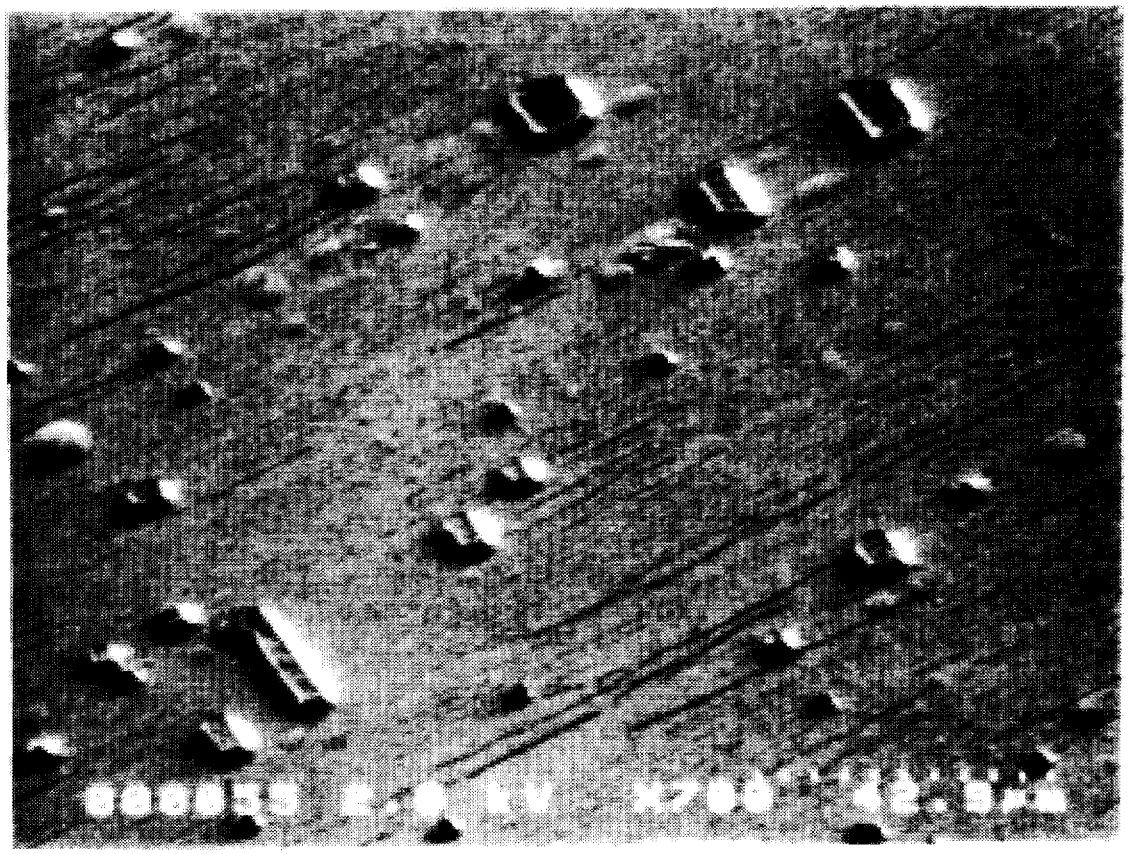

FIG. 9 shows an optical characteristics of a liquid crystal electro-optical device according to another comparative example described in Embodiment 4 obtained by pulse voltage application;

FIG. 10 shows a current-voltage characteristics of a liquid crystal electro-optical device according to Embodiment 5;

FIG. 11 shows a current-voltage characteristics of a liquid crystal electro-optical device according to a comparative example described in Embodiment 5;

FIG. 12 shows an optical characteristics of liquid crystal electro-optical devices according to comparative examples described in Embodiments 4 and 5 obtained by pulse voltage application;

FIG. 13 shows a current-voltage characteristics of a liquid crystal electro-optical device according to Embodiment 6;

FIG. 14 shows a current-voltage characteristics of a liquid crystal electro-optical device according to a comparative example described in Embodiment 6;

FIG. 15 shows a current-voltage characteristics of a liquid crystal electro-optical device according to Embodiment 7;

FIG. 18 shows an optical characteristics of a liquid crystal electro-optical device according to Embodiment 7 obtained by pulse voltage application;

FIG. 17 shows a current-voltage characteristics of a liquid crystal electro-optical device according to a comparative example described in Embodiment 7;

FIG. 18 shows an optical characteristics of a liquid crystal electro-optical device according to a comparative example described in Embodiment 7 obtained by pulse voltage application;

FIG. 19 shows a current-voltage characteristics according to Embodiments 9 and 10;

FIG. 20 shows an optical characteristics of a liquid crystal electro-optical device according to Embodiments 9 and 10 obtained by pulse voltage application after ultraviolet ray irradiation;

FIG. 21 shows an optical characteristics of a liquid crystal electro-optical device according to Embodiment 10 obtained by pulse voltage application before ultraviolet ray irradiation;

FIG. 22 shows an optical characteristics of a liquid crystal electro-optical device according to Embodiment 11 obtained by pulse voltage application before ultraviolet ray irradiation;

FIG. 23 shows an optical characteristics of a liquid crystal electro-optical device according to Embodiment 11 obtained by pulse voltage application after ultraviolet ray irradiation;

FIG. 24 shows a current-voltage characteristics according to Comparative Examples 1 and 2;

FIG. 25 shows an optical characteristics of a liquid crystal electro-optical device according to Comparative Example 1 obtained by pulse voltage application;

FIG. 26 shows an optical characteristics of a liquid crystal electro-optical device according to Comparative Example 2 obtained by pulse voltage application; and FIG. 27 shows SEM photograph of a fine pattern formed on a substrate.

DETAILED DESCRIPTION OF THE PREFERRED EMBODIMENTS

The present invention is illustrated in greater detail referring to non-limiting examples below. It should be under-

12 stood, however, that the present invention is not to be construed as being limited thereto.

EMBODIMENT 1

Figure 1:
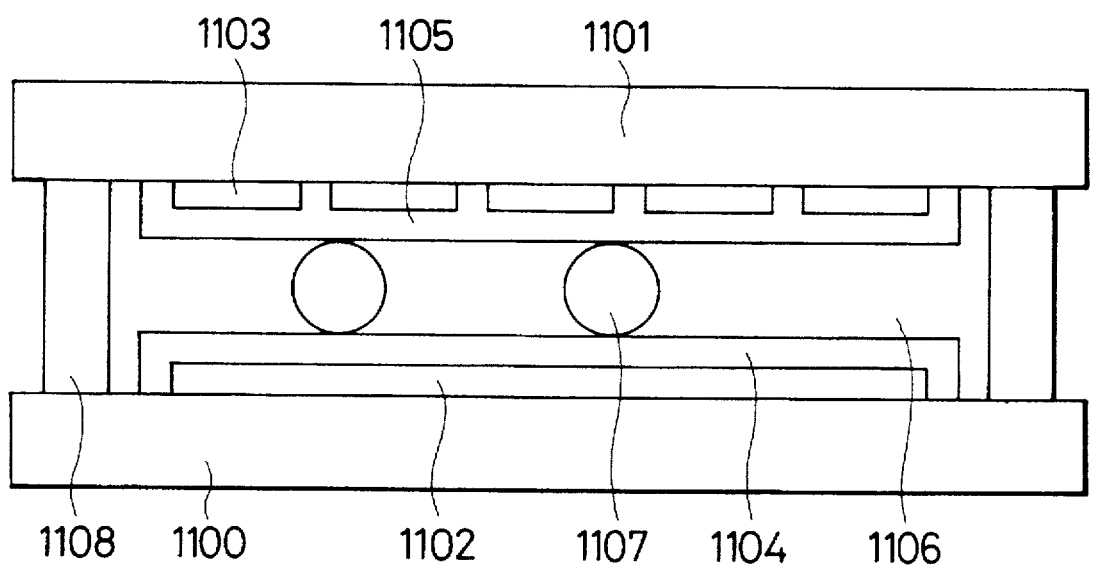
FIG. 1 shows a schematic cross section view of a prior art liquid crystal cell.
Figure 2:
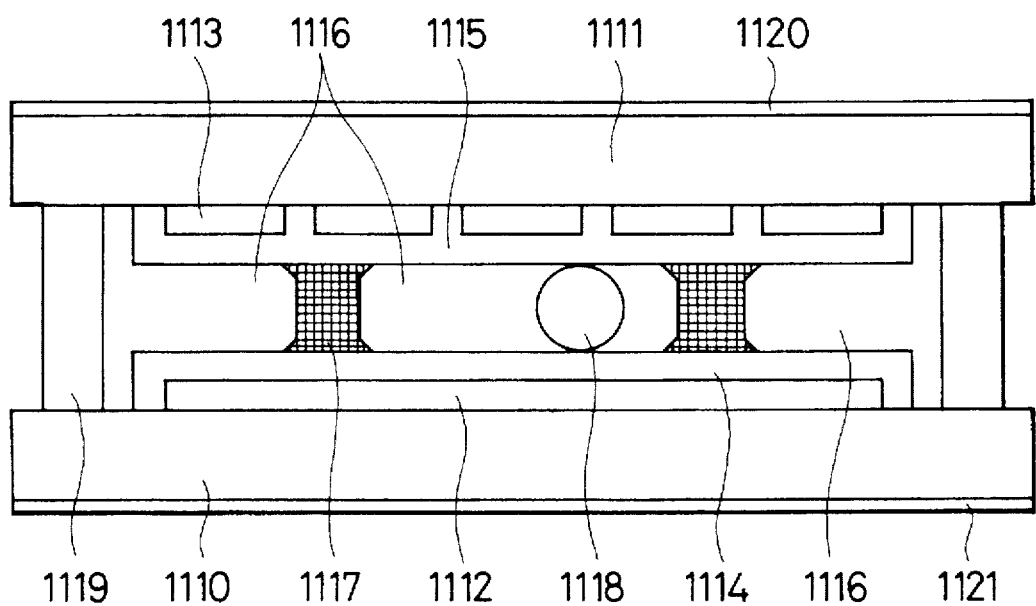
FIG. 2 shows a schematically drawn basic structure of a liquid crystal cell according to the present invention.

Referring to FIG. 2, a process for fabricating a liquid crystal electrooptical device using a ferroelectric liquid crystal according to an embodiment of the present invention is described below.

Indium tin oxide (abbreviated hereinafter as "ITO") films 1112 and 1113 were deposited on 10-cm² square blue sheet glasses 1110 and 1111 to a thickness of from 500 to 2,000 Å, specifically 1,000 Å in this case, by sputtering or vapor deposition, and were each patterned by a conventional photolithography. Polyimide films 1114 and 1115 were formed to a thickness of from 100 to 300 Å, specifically 100 Å in this case, on the surface of the resulting substrate by spin coating, and the films thus formed were calcined at 280° C. Usable as the polyimide films are those of LQ5200 (produced by Hitachi Chemical Co., Ltd.), LP-64 (Toray Industries, Inc.) and RN-305 (Nissan Chemical Industries, Inc.). The substrates thus obtained were subjected to rubbing treatment to impart uniaxial molecular orientation. Spherical silica grains manufactured by Catalysts & Chemicals Industries Co., Ltd. were scattered as spacers 1118 on one of the substrates, and a sealing material 1119 made of an epoxy resin was formed by screen printing on the other substrate. Both substrates were adhered while maintaining a spacing of about 1.5 μm by incorporating the spacers between the substrates. Thus was a cell completed.

A 1:1 mixture of ferroelectric liquid crystals expressed by the following formulae was used as the liquid crystal material:

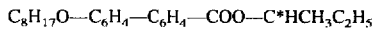

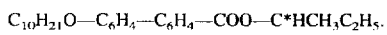

$C_8H_{17}O—C_6H_4—C_6H_4—COO—C^*HCH_3C_2H_5$ $C_{10}H_{21}O—C_6H_4—C_6H_4—COO—C^*HCH_3C_2H_5.$

The phase transition occurs in the sequence of:

isotropic-smectic A-smectic C-crystalline

A commercially available UV-curable resin was used as the resin. The mixture to be incorporated between the substrates was such comprising from 5 to 15% of the uncured resin, and the liquid crystal material as the rest; i.e., the liquid crystal material accounted for 85 to 95% of the mixture. By adding the resin to the liquid crystal material, the transition from the isotropic phase to the liquid crystal phase was found to occur at a temperature lowered by 5° to 20° C. from the initial transition point.

The liquid crystal material and the cell were both heated to 100° C., and the liquid crystal material was injected into the cell under vacuum. Thereafter, the liquid crystal material inside the cell was gradually lowered to room temperature at a cooling rate of from 2° to 20° C./hour, specifically 3° C./hour in this case. The molecular orientation of the cooled liquid crystal was observed by an optical microscope with crossed nicols to find the molecules being uniaxially arranged along the rubbing direction. In other words, a clear extinction was confirmed by the observation using the optical microscope with crossed nicols.

The resin was observed to precipitate in scattered spots between the liquid crystal material. The resin exhibited no birefringence, and was completely dark under the polarized microscope. It can be seen that the liquid crystal material is completely separated from the uncured resin.

Then, UV light was irradiated to the cell to cure the resin inside the cell. The UV light irradiation was performed at an intensity of from 3 to 30 mW/cm² for a duration of from 0.5 to 5 minutes; more specifically, at an intensity of 10 mW/cm² for a duration of 1 minute in this case.

The molecular orientation of the liquid crystal material after the UV irradiation was found to be favorable, and was substantially the same as that observed under the optical microscope before irradiating UV light.

Thus, electric current was applied in rectangular waves to the resulting cell to measure the contrast ratio. The results are summarized in Table 1.

TABLE 1

| Measured Electrooptical Characteristics | | |
|---|---|---|
| | Resin content in the mixture (%) | |
| | 5 | 15 |
| ON transmittance (%) | 30 | 27 |
| OFF transmittance (%) | 0.6 | 0.6 |
| Contrast ratio | 50 | 45 |

As can be read from Table 1, the ON transmittance was found to be slightly lower for a mixture containing the resin at a higher content as compared to that with a lower content, because the area which does not undergo switching increases with increasing content of the resin within the mixture. The OFF transmittance is the same for both cells, because the OFF transmittance is not influenced by the content of the resin. There is no considerable difference between the contrast ratio, because it is the ratio of the ON transmittance to the OFF transmittance. The presence of resin was not visible from the substrate side. Conclusively, a device well comparable to the conventional ones can be implemented by using a mixture containing from bout 0.1 to 20% of resin as the liquid crystal material. In other words, favorable devices can be obtained by confining the area of the liquid crystal material in the display portion to a range of from 80 to 99.9%.

Then, the effect of slow cooling was confirmed by observing the change in molecular orientation with decreasing the cooling rate. The results are given in Table 2.

TABLE 2

| Change in Molecular Orientation with Change in Cooling rate | |
|---|---|
| Cooling rate (°C./hr) | Molecular Orientation |
| 200 | Contains large portions of non-uniaxial orientation |
| 100 | Contains portions of non-uniaxial orientation |
| 20 | Uniaxial orientation |
| 2 | Uniaxial orientation |

It can be seen that there generated portions which failed to achieve uniaxial orientation with a cooling rate of 100° C./hour or faster. Favorable liquid crystal material having a uniaxial molecular orientation and which can be used without any practical problem can be obtained at a cooling rate of 20° C./hour or lower. Accordingly, it was confirmed that slow cooling is preferred in obtaining a favorable liquid crystal material with uniaxial molecular orientation.

Next, polarizing plates 1120 and 1121 are provided on the substrates 1110 and 1111 to complete the cell.

As described in the foregoing, a cell having a uniform spacing between the electrodes was obtained. No uneven display and other defects were observed on the thus completed cell even when the cell was allowed to stand perpendicularly. No deformation occurred on the substrate, and the ferroelectric liquid crystal maintained its layered structure.

Then, the substrate was peeled off from the cell, and the liquid crystal was removed by washing the material with an alcohol to observe the resin residue on the substrate by means of scanning electron microscopy (SEM). The resin was observed to be present in columns to fix the two substrates together. The SEM observation is illustrated in FIG. 27.

The morphology of the resin depends on factors such as the sequence of phase transition and the cooling rate. Furthermore, the distance between the neighboring resin columns in this case were found to be in the range of from 10 to 100 μm.

Figure 3:
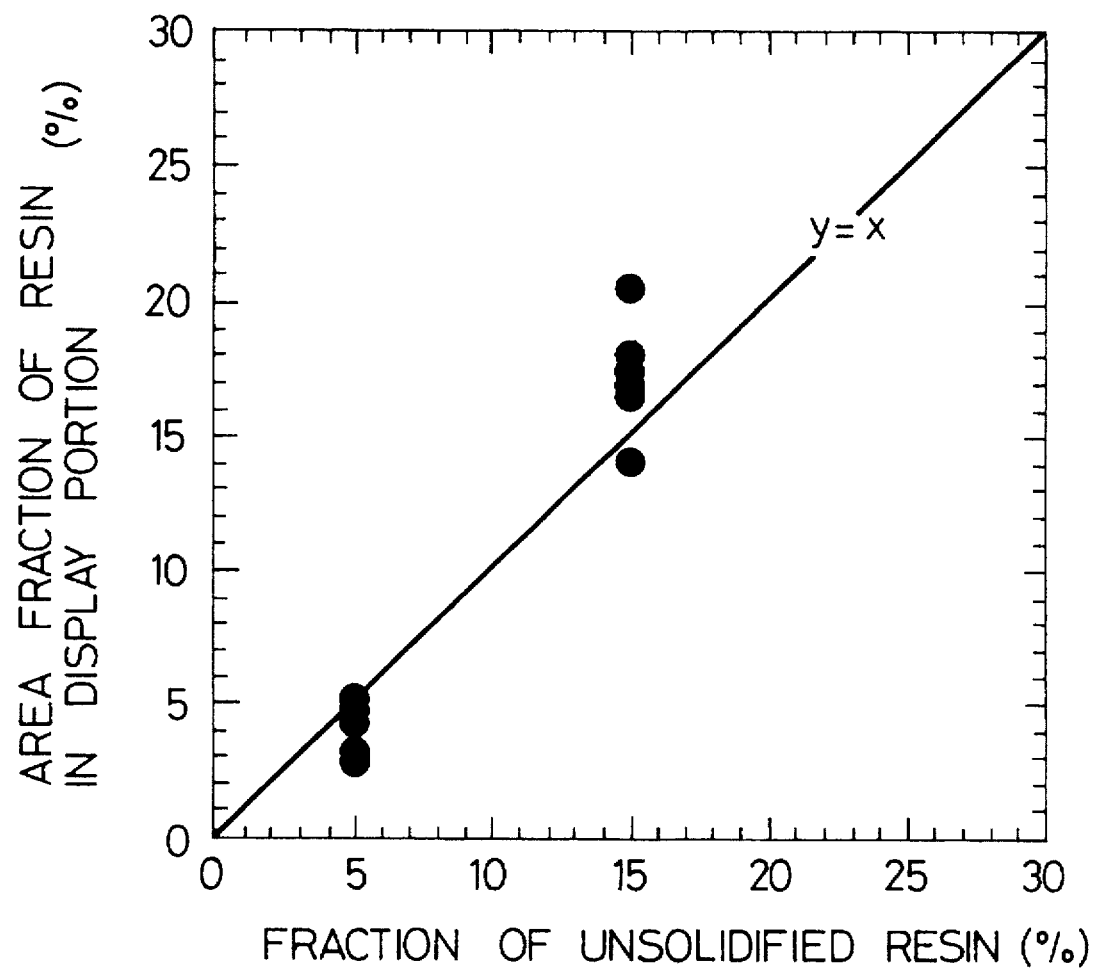
FIG. 3 shows a relation between the area fraction of the resin in the display portion and the fraction of unsolidified resin within the mixture.
Figure 4:
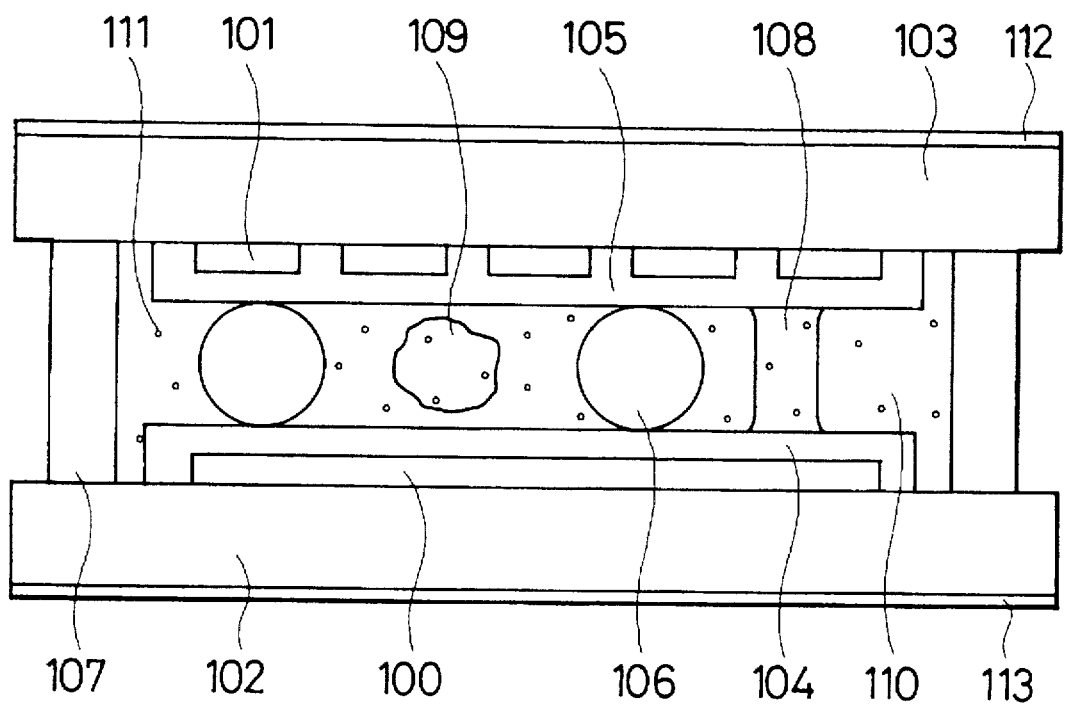
FIG. 4 is a schematic cross-sectional view of a liquid crystal electro-optical device according to the present invention.

FIG. 3 is a graph which relates the area fraction of the resin in the display portion with the fraction of uncured resin within the mixture. As FIG. 3 reads, the both variables are in linear relationship, and that the uncured resin was mostly cured into a column shape after the UV irradiation.

EMBODIMENT 2

A process for fabricating a device in which a liquid crystal material comprising a liquid crystal operating in an STN mode is used, which is also an embodiment according to the present invention, is described below.

After patterning an ITO film deposited on a substrate 15 inch in diagonal, an orientation film was formed thereon by means of off-set printing using a stripe coater. An SE-4110 or an SE610 film produced by Nissan Chemical Industries, Inc. was used for the orientation film. The film thus obtained was calcined at a temperature of from 200° to 300° C., specifically in this case, at 280° C. to obtain a film from 600 to 1,000 Å in thickness. More specifically, the resulting film in this case was found to be 800 Å in thickness. Then, the two substrates were subjected to rubbing treatment, so that when assembled, the facing substrates may yield an angle of 240° between the two rubbing direction. Furthermore, 6.5-μm diameter silica spacers were scattered on one of the substrates, and seal printing was applied to the other substrate. Then, the resulting substrates were assembled in such a manner that the treated surfaces may face with each other, and were heated and fixed while applying pressure.

The liquid crystal material used in this case was ZLI-2293 produced by Merck & Co., Inc., and S-811 was added therein as a chiral agent at an amount of from 0.1 to 3%, specifically in this case, at 0.12%. After adjusting the pitch, the cell thickness was controlled to give a cell thickness to the pitch length ratio of 0.50 to 0.55. Then, a liquid crystal material comprising a liquid crystal added therein 5% of a UV curable resin was injected into the cell under vacuum. The resulting cell containing therein the liquid crystal material was subjected to pressing to remove the liquid crystal in excess, and was heated at 120° C. for an hour. This was followed by slow cooling to room temperature.

UV light was irradiated to the resulting cell at an intensity of from 3 to 30 mW/cm$^2$, more specifically, at 10 mW/cm$^2$. The cell was found to contain resin scattered therein. Thus, a STN panel was obtained by combining a polarizer sheet and a color compensation sheet.

The resulting panel, which was as large as 15 inches in diagonal, was found to have a uniform spacing between the electrodes. This was realized because the two substrates were fixed by the resin incorporated inside the cell. The cell was found to yield a contrast ratio of 15 upon operating at a duty of 200, which was well comparable to that of a conventional device using no resin.

EMBODIMENT 3

A process for fabricating a liquid crystal electrooptical device of a birefringence control type, which is also an embodiment according to the present invention, is described below.

An orientation film was formed on a substrate having thereon an ITO film by means of spinner, and was calcined in the temperature range of from 250° to 300° C. More specifically, the film used herein was such made of SE-7511L or RN715 produced by Nissan Chemical Industries, Inc., or of LQ-1800 produced by Hitachi Chemical Co., Ltd., and was calcined at 300° C. The film was provided at a thickness of from 500 to 1,000 Å, and specifically, 600 Å in this case. The orientation film must be highly hydrophobic, so that the nematic liquid crystal molecules may be easily achieve a perpendicular orientation. Thus, a cell having an inter-electrode spacing of 6 µm was obtained using these substrates. Then, a mixture comprising UV-curable resin added into a nematic liquid crystal having a negative dielectric anisotropy, ZLI-4318 (produced by Merck & Co., Inc.), was injected into the cell. The liquid crystal material was found to have a dielectric anisotropy of −2.0.

After slow cooling, UV light was irradiated to the mixture of the liquid crystal to cure the resin dispersed in the mixture. Then, the resulting mixture was subjected to an observation using an optical microscope to observe the image under conoscope. A cross image was observed, and was hence confirmed that the liquid crystal molecules were arranged perpendicularly with respect to the surface of the substrate. Furthermore, a contrast ratio of 80 was obtained on applying a driving voltage to the cell. A substantially uniform display was realized. As described in the foregoing, the both substrates were fixed with a resin without impairing the molecular orientation and contrast ratio inherent to the liquid crystal material.

Embodiment 4

A film of indium tin oxide (ITO), which is an electrode material, was formed by sputtering or vapor deposition or the like to a thickness of 500–2000 Å, in this embodiment 1000 Å, on each of a pair of 30 cm square, 1.1 mm thick glass substrates, and electrodes were patterned by an ordinary photolithography process. Polyimide was coated onto these substrates by spin coating and baked at 280° C. As the polyimide, Nissan Chemical Industries, Ltd.'s RN-305 or TORAY INDUSTRIES, INC.'s LP-64, here TORAY INDUSTRIES, INC.'s LP-64, was used. The polyimide film thickness is 100–800 Å, and in this embodiment was 150 Å. Rubbing treatment was carried out on the substrates to impart uniaxial orientation. On one of the substrates, CATALYSTS & CHEMICALS INDUSTRIES CO., LTD.'s Shinshikyu, which are silica particles, were scattered as spacers, and on the other substrate a seal material made of epoxy resin was formed by screen printing. The two substrates were pasted together to form cells, with the distance between their electrodes being made about 1.5 µm. To prevent shorting between the electrodes, an insulating film may be formed covering the electrodes and leads on the substrates, and an orientation film formed on top of that.

The liquid crystal material that was used in this embodiment was CHISSO CORPORATION's strongly dielectric liquid crystal, CS1014. The Ps of this liquid crystal is 5.4 nC/cm$^2$, and the phase series is I (isotropic phase) –N (nematic phase) –A (smectic A phase) –C* (smectic C* phase).

The resin material used in this embodiment was a commercially available ultraviolet ray-hardening type resin, and for the reaction initiator in the resin material, from among those with which the effects of the invention could best be obtained, Ciba Geigy Co.'s highly reactive Irugacure 369 was used.

The liquid crystal material, 95%, and as the resin material a resin structure material to which the reaction initiator had been added, 5%, were mixed together, and so that the mixed-in resin material would mix better throughout the liquid crystal material the mixture was heated at 100° C. until the liquid crystal showed isotropic phase and stirred so that the resin mixed throughout the liquid crystal uniformly to form a liquid crystal mixture. With respect to the overall quantity of the reaction initiator and the resin structure material, the quantity of reaction initiator added was 3%.

The cells and the liquid crystal mixture were heated to 100° C., and after the liquid crystal mixture was poured into the cells in a vacuum as described above the cells were gradually cooled to room temperature at 2°–20° C./hour, in this embodiment 2° C./hour. When the orientation state at room temperature after cooling was observed using a polarized light microscope, the resin material was present at points throughout the cells and the orientation of the liquid crystal material was such that, like a liquid crystal material to which resin has not been added, the liquid crystal was uniaxially oriented in the rubbing direction of the orientation film, and good quenching levels were obtained.

These cells were irradiated with ultraviolet rays, strength 3–30 mW/cm$^2$ irradiation duration 0.5–5 min in this embodiment 1 minute at strength 20 mW/cm$^2$, to harden the resin. After the ultraviolet ray irradiation also the liquid crystal was uniaxially oriented in the rubbing direction of the orientation film, and good quenching levels were obtained. The proportion of the surface area of the display portion of these cells that were occupied by the resin material was approximately 5%. This hardened resin could be observed with a microscope, but with the naked eye it was completely impossible to confirm its existence. A polarizing plate, etc, was added to these cells and a liquid crystal electro-optical device was made.

Figure 5:
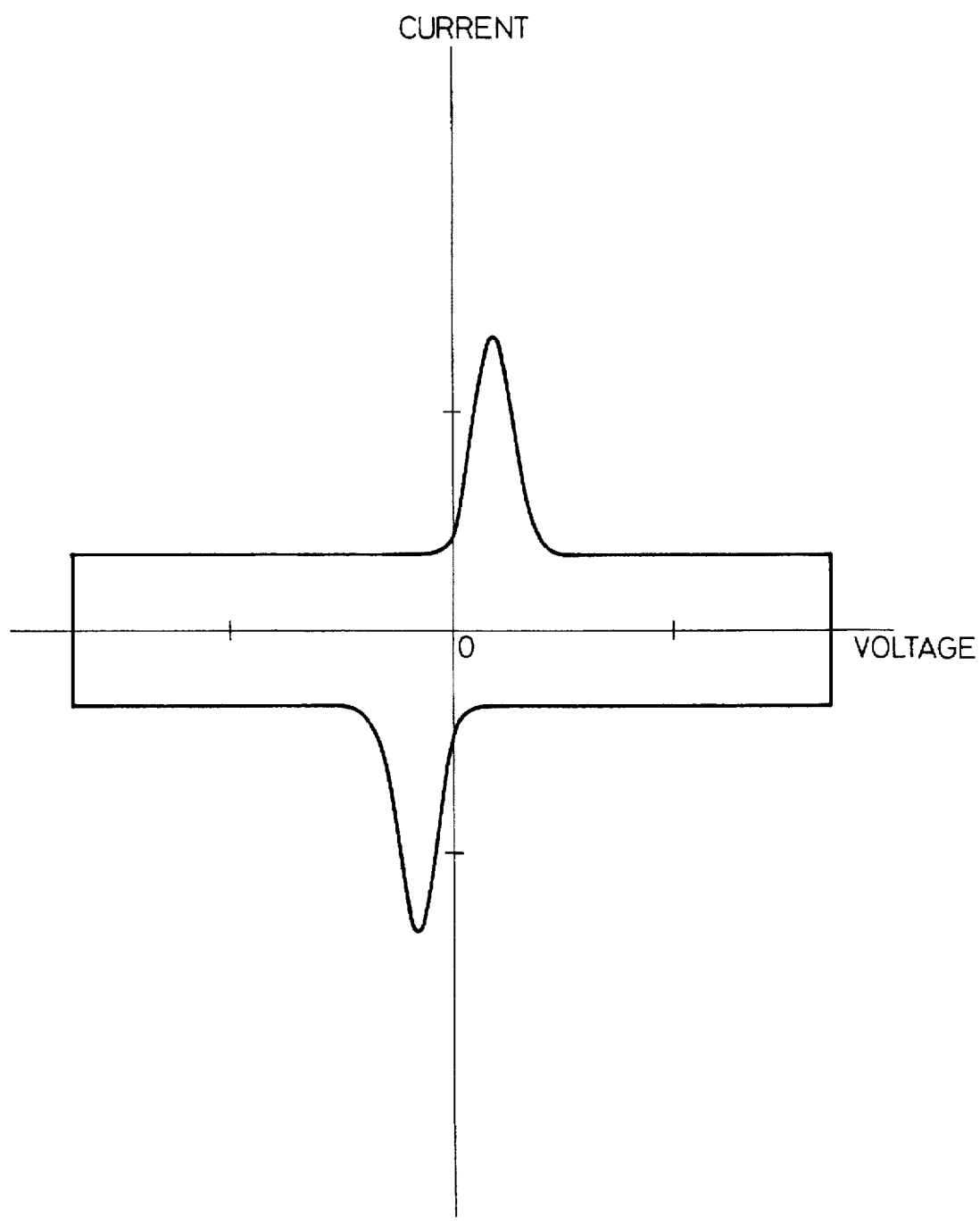
FIG. 5 shows a current-voltage characteristics of a liquid crystal electro-optical device according to Embodiment 4.

When the electric current characteristic (hereinafter referred to as the current-voltage characteristic) was measured while a triangular wave of ±30 V, 5 Hz was applied across the upper and lower electrodes of this liquid crystal electro-optical device and the voltage continuously varied, as shown in FIG. 5 at a certain voltage value a Ps peak only, where the liquid crystal molecules changed the direction of spontaneous polarization through 180°, in other words reversed, could be observed.

Figure 6:
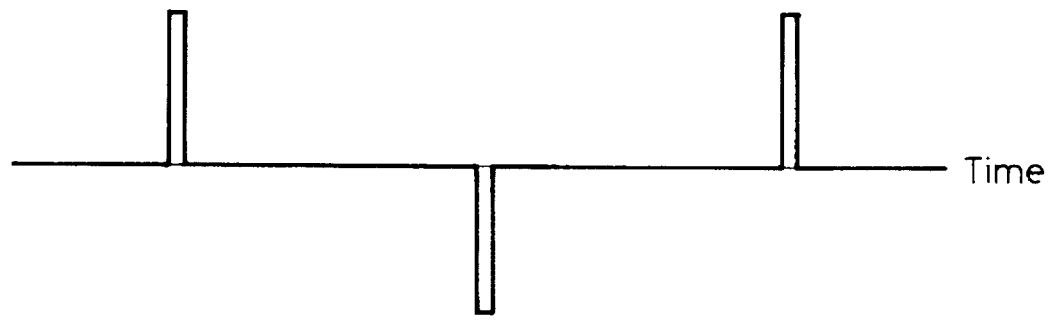
Figure 6:
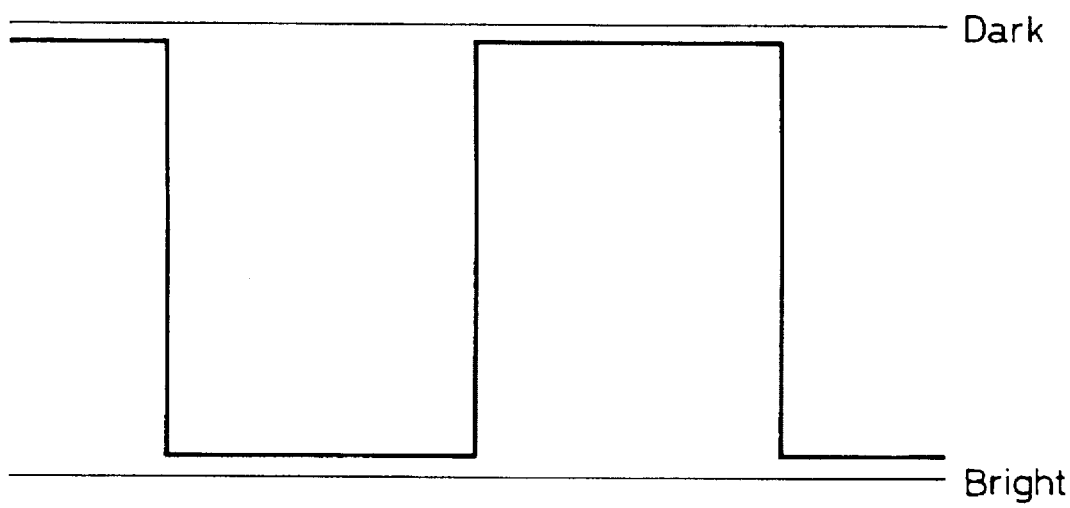

The optical characteristic when a 1 µsec, 15 V pulse was applied (open during non-application) every 1 second across the electrodes of this device to activate the device is shown in FIG. 6 (Note: In the embodiments in this specification, graphs showing current-voltage characteristics and optical characteristics show relative values of the respective elements). As is clear from the graph, during voltage applications above the Ps peak voltage a very sharp bright-dark reversal occurs, and furthermore this state is stable. The memory characteristic at times of shorting was also good.

Even when the proportion of the resin in the liquid crystal mixture was changed from 0.1% through 20%, the proportion of the surface area of the display portion occupied by the resin in the cells after hardening was the same as the proportion of the resin, from 0.1% through 20%, and the resin was dispersed throughout the cells. Also, when these cells in which the resin had hardened were cut in the thickness direction and the liquid crystal was washed off with ethanol and the shape of the resin portions were observed with an SEM, it was confirmed that the resin existed as column shapes adhering the upper and lower substrates and as resin lumps.

In a liquid crystal electro-optical device made in this way, display blurring and flickering and the like were not observed and an extremely high-performance device having stable optical characteristics could be made. Also, when a liquid crystal electro-optical device of active matrix type having a plurality of pixel electrodes on the inner surface of one of the substrates and thin film transistors connected to these pixels was made with its cells filled with a liquid crystal mixture of this invention, a device having high speed and high contrast ratios could be obtained. Furthermore, the distance between the substrates was maintained by the resin, and, despite the large 30 cm-square surface area, increases in the distance between the substrates due to bending of the substrates when the device was stood up and used in an upright position, and reductions in the distance between the substrates when the substrate surface was pushed with a finger or the like, did not occur, and nor was there any display blurring or disordering of the liquid crystal layer structure and orientation.

For comparison, measurement of the characteristics of a device made with the same structure, manufacturing conditions, and liquid crystal material, but without any resin material, i.e. unhardened resin material and reaction initiator, being mixed into the liquid crystal material, was carried out. The liquid crystal and the cells were heated to 100° C. and the liquid crystal was poured into the cells in a vacuum and the cells gradually cooled. When the orientation state at room temperature after cooling was observed using a polarized light microscope, the liquid crystal was uniaxially oriented in the rubbing direction of the orientation film, and good quenching levels were obtained. A polarizing plate, etc, was added to these cells and a liquid crystal electro-optical device was made.

Figure 7:
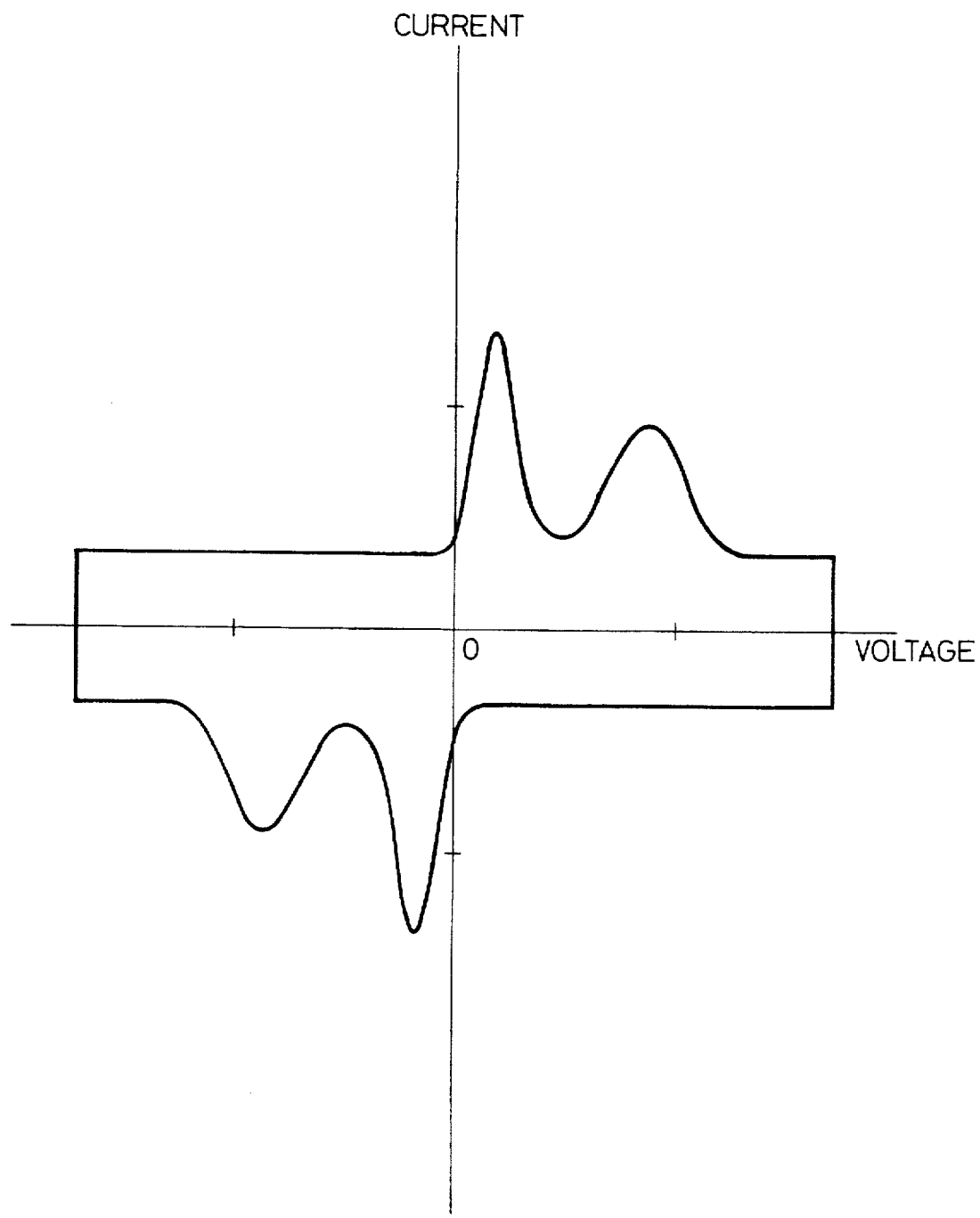
FIG. 7 shows a current-voltage characteristics of a liquid crystal electro-optical device according to a comparative example described in Embodiment 4.

When a triangular wave of ±30 V, 5 Hz was applied to this liquid crystal electro-optical device and its current-voltage characteristic measured, as shown in FIG. 7 a Ps peak and a rise and fall in current, i.e. a secondary peak, which apparently is a movement of charge within the device, was measured.

Figure 8:
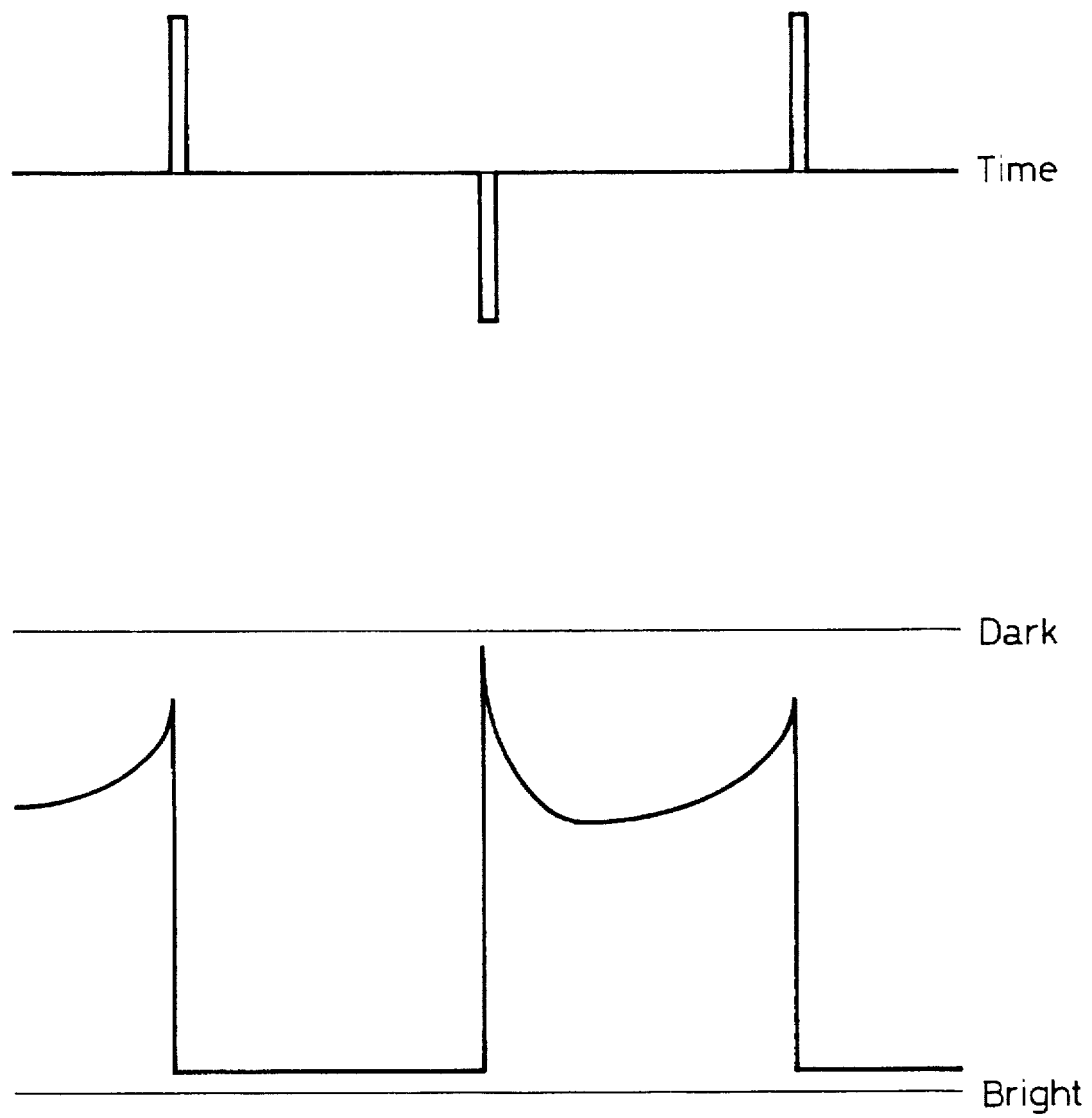
FIG. 8 shows optical characteristics of liquid crystal electro-optical devices according to Embodiments 4, 5 and 6 obtained by pulse voltage application.

The optical characteristic observed when a 1 μsec, 15 V pulse was applied every 1 second to this device to activate it is shown in FIG. 8. Although the liquid crystal molecules did reverse into a dark state on voltage application, this dark state unstably changed with time toward the bright state side and after that toward the dark state side again. Also, this dark state was not of very good quality.

Also, when the device was stood up and used in an upright position, liquid crystal material collected at the lower portions of the substrates and areas where the distance between the substrates became large formed, and when the device was pushed with a finger the distance between the substrates at the pushed portions decreased, and along with this the layer structure collapsed and display blurring occurred.

Next, 95% and 5% respectively of the liquid crystal material and the resin material were mixed together, and the amount of the reaction initiator added to the resin material was changed from 0% through 10% of the total amount of the resin structure material and the reaction initiator.

When the amount of reaction initiator added was 0%, the liquid crystal became uniaxially oriented in the rubbing direction of the orientation film and good quenching levels were obtained; however, when a triangular wave voltage was applied and the current-voltage characteristic was measured a Ps peak and a secondary peak were measured. The optical characteristic observed when a 1 μsec, 15 V pulse was applied every 1 second to this device to activate it is shown in FIG. 9. Although the liquid crystal molecules did reverse into a dark state on voltage application, this dark state changed with time and shifted a little toward the bright state. Although the device showed a slightly better characteristic than the example discussed above (FIG. 8) in which resin was not added, instability remained. Also, the resin of course did not harden.

In the case of the reaction initiator used in this embodiment, when the added amount was made 0.3% or more, the resin hardened, the secondary peak was suppressed, and the characteristics were improved.

Embodiment 5

In this preferred embodiment, the structure of the device and the ratio of liquid crystal to resin, and the type and added amount of the reaction initiator in the resin, are the same as in embodiment 4. For the liquid crystal material in this embodiment, CHISSO CORPORATION's CS1015, whose Ps is 6.6 nC/cm$^2$ and whose phase series shows I-N-A-C*, was used. The resin material was added to the liquid crystal material and, in order to better mix the resin material throughout the liquid crystal material, the mixture was heated to 90° C. and stirred; this was poured under a vacuum into cells preheated to 90° C., and after this was gradually cooled the resin was hardened by irradiation with ultraviolet rays. The liquid crystal became uniaxially oriented in the rubbing direction and good quenching levels were obtained. A polarizing plate was added to these cells and a liquid crystal electro-optical device was made.

When a triangular wave of ±30 V, 5 Hz was applied to this liquid crystal electro-optical device and its current-voltage characteristic measured, as shown in FIG. 10 a Ps peak only could be observed.

The optical characteristic when a 1 μsec, 15 V pulse was applied (open during non-application) every 1 second to this device to activate it was the same as that of embodiment 4: a sharp bright-dark reversal occurred along with the voltage application, and these bright and dark states did not change with time and were stable. The memory characteristic during shorting was also good.

In a liquid crystal electro-optical device made in this way display blurring and flickering and the like were not observed, and an extremely high-performance device having stable optical characteristics could be made. Also, when a liquid crystal electro-optical device of active matrix type having a plurality of pixel electrodes on the inner surface of one of the substrates and thin film transistors connected to these pixels was made with its cells filled with a liquid crystal mixture of this invention, a device having high speed and high contrast ratios could be obtained. Furthermore, the distance between the substrates was maintained by the resin, and, despite the large 30 cm-square surface area, increases in the distance between the substrates due to bending of the substrates when the device was stood up and used in an upright position, and reductions in the distance between the substrates when the substrate surface was pushed with a finger or the like, did not occur, and nor was there any display blurring or disordering of the liquid crystal layer structure and orientation.

For comparison, in the structure of this embodiment, the cells were filled with the liquid crystal material only, without the resin structure material or the reaction initiator being added, and the characteristics were investigated. The liquid crystal became uniaxially oriented in the rubbing direction of the orientation film, and good quenching levels were obtained, but when a triangular wave was applied to the electrodes and the current-voltage characteristic was measured, as shown in FIG. 11 a Ps peak and a secondary peak were observed.

The optical characteristic as of when this device was activated by a 1 μsec, 15 V pulse applied every 1 second is shown in FIG. 12. Although the liquid crystal molecules did reverse into a dark state on voltage application, they soon unstably changed toward the bright state side.

Also, when the device was stood up and used in an upright position, liquid crystal material collected at the lower portions of the substrates and areas where the distance between the substrates became large formed, and when the device was pushed with a finger the distance between the substrates at the pushed portion decreased, the layer structure of the liquid crystal broke down and display blurring occurred.

Embodiment 6

In this embodiment, the structure of the device and the mixture ratio of liquid crystal to resin in the liquid crystal mixture are the same as in embodiment 4. However, for the liquid crystal material in this embodiment, CHISSO CORPORATION's CS1017, whose Ps is 9.3 nC/cm$^2$ and whose phase series shows I-N-A-C*, was used. In order to better mix the added resin material throughout the liquid crystal material, the mixture was heated to 80° C. and stirred; this was poured under a vacuum into cells preheated to 80° C., and after this was gradually cooled the resin was hardened by irradiation with ultraviolet rays. The liquid crystal became uniaxially oriented in the rubbing direction of the orientation film and good quenching levels were obtained. A polarizing plate, etc, was added to complete the device.

When the electric current was measured while a voltage applied to this liquid crystal electro-optical device was continuously varied, as shown in FIG. 13 a Ps peak only could be observed.

The optical characteristic when a 1 μsec, 15 V pulse was applied (open during non-application) every 1 second to this device to activate it was the same as that of embodiment 4: a sharp bright-dark reversal occurred along with the voltage application, and these bright and dark states did not change with time and were stable. The memory characteristic during shorting was also good.

In a liquid crystal electro-optical device made in this way, display blurring and flickering and the like were not observed and an extremely high-performance device having stable optical characteristics could be made. Also, when a liquid crystal electro-optical device of active matrix type having a plurality of pixel electrodes on the inner surface of one of the substrates and thin film transistors connected to these pixels was made with its cells filled with a liquid crystal mixture of this invention, a device having high speed and high contrast ratios could be obtained. Furthermore, the distance between the substrates was maintained by the resin, and, despite the large 30 cm-square surface area, increases in the distance between the substrates due to bending of the substrates when the device was stood up and used in an upright position, and reductions in the distance between the substrates when the substrate surface was pushed with a finger or the like, did not occur, and nor was there any display blurring or disordering of the liquid crystal layer structure and orientation.

For comparison cells were made without mixing resin structure material and reaction initiator into the liquid crystal. The liquid crystal became uniaxially oriented in the rubbing direction, and good quenching levels was obtained, but when a triangular wave was applied to this device and the current-voltage characteristic was investigated, as shown in FIG. 14 a Ps peak and a secondary peak were observed.

The optical characteristic observed when this device was activated by a 1 μsec, 15 V pulse applied every 1 second was roughly the same as that shown in FIG. 12 of embodiment 5. Although the liquid crystal molecules did reverse into a dark state on voltage application, they soon unstably changed toward the bright state side.

Also, when the device was stood up and used in an upright position, liquid crystal material collected at the lower portions of the substrates, areas where the distance between the substrates became large formed, and when the device was pushed with a finger the distance between the substrates at the pushed portion decreased, and along with this the layer structure of the liquid crystal broke down and display blurring occurred.

Embodiment 7

In this preferred embodiment, the structure of the device and the ratio of liquid crystal to resin, and the type and added amount of the reaction initiator in the resin, are the same as in embodiment 4. However, for the liquid crystal material in this embodiment, a strongly dielectric biphenyl-type liquid crystal whose Ps is 10.9 nC/cm$^2$ and whose phase series shows I-A-C*, was used. The resin material was a commercially available ultraviolet ray-hardening type resin. For the reaction initiator in the resin material, Ciba Geigy Co.'s Irugacure 184 was mixed in to a ratio of 1% with respect to the total quantity of the resin structure material and the reaction initiator.

In order to better mix the added resin material throughout the liquid crystal, the mixture was heated at 120° C. until the liquid crystal showed isotropic phase and stirred; this was poured under a vacuum into cells preheated to 120° C., and after this was gradually cooled the resin was hardened by irradiation with ultraviolet rays. The orientation state was similar to that of liquid crystal to which resin has not been added: the liquid crystal became uniaxially oriented in the rubbing direction and good quenching levels was obtained. A polarizing plate, etc, was added to complete a liquid crystal electro-optical device.

When the electric current was measured while a voltage applied to this liquid crystal electro-optical device was continuously varied, as shown in FIG. 15 a Ps peak only could be observed.

Figure 16:
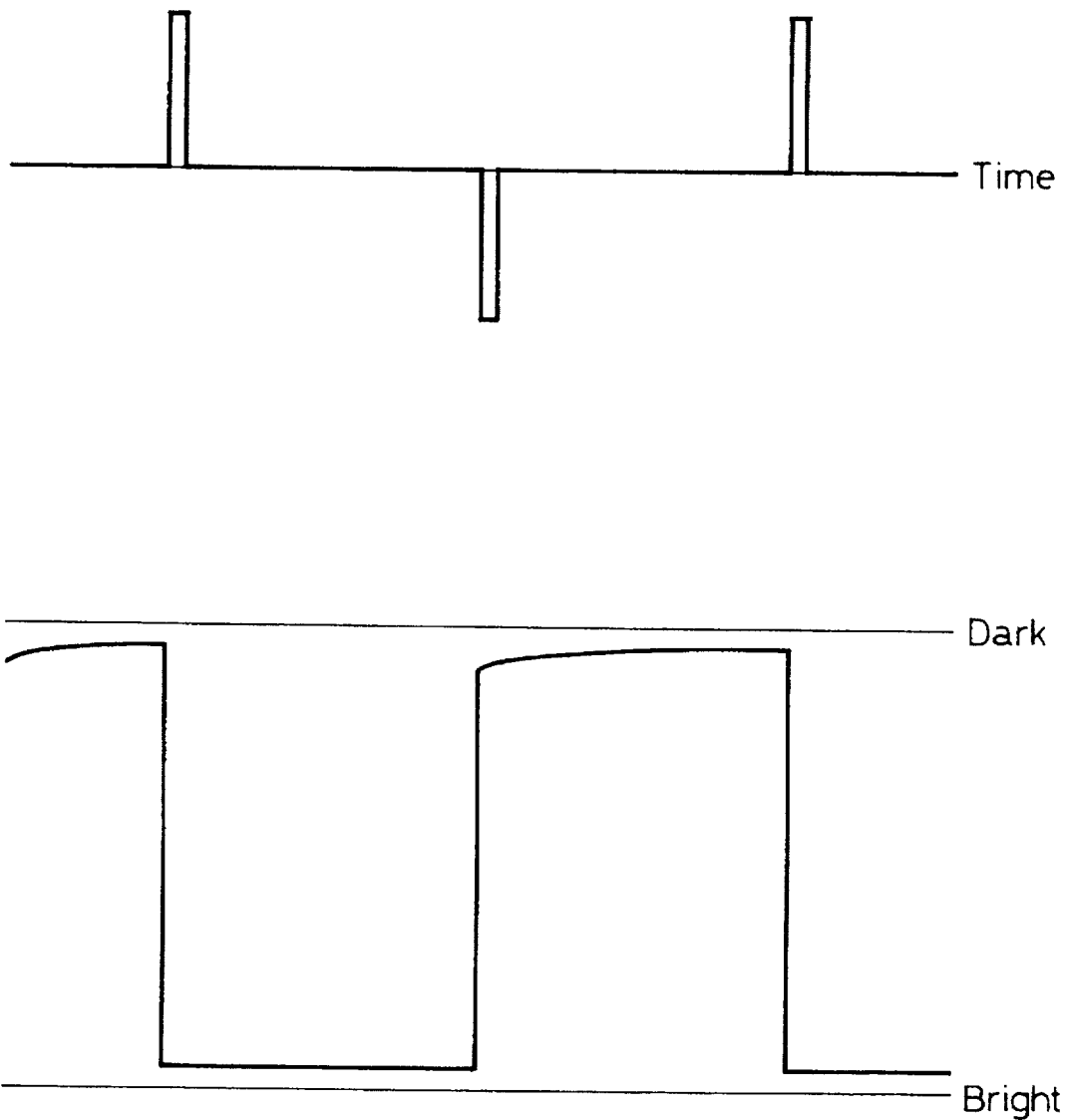

The optical characteristic when a 1 μsec, 15 V pulse was applied (open during non-application) every 1 second to this device to activate it is shown in FIG. 16. As is clear from the graph, it was found that bright-dark reversal occurred along with the voltage application, and the optical characteristic, especially the dark state, became good and this state was also stable. The memory characteristic during shorting was also good.

In a liquid crystal electro-optical device made in this way, display blurring and flickering and the like were not observed and an extremely high-performance device having stable optical characteristics could be made. Also, when a liquid crystal electro-optical device of active matrix type having a plurality of pixel electrodes on the inner surface of one of the substrates and thin film transistors connected to these pixels was made with its cells filled with a liquid crystal mixture of this invention, a device having high speed and high contrast ratios could be obtained. Furthermore, the distance between the substrates was maintained by the resin, and, despite the large 30 cm-square surface area, increases in the distance between the substrates due to bending of the substrates when the device was stood up and used in an upright position, and reductions in the distance between the substrates when the substrate surface was pushed with a finger or the like, did not occur, and nor was there any display blurring or disordering of the liquid crystal layer structure and orientation.

For comparison a cell was made without adding resin material to the liquid crystal material. The liquid crystal became uniaxially oriented in the rubbing direction, and good quenching levels was obtained, but when the current-voltage characteristic was measured, as shown in FIG. 17 a Ps peak and a secondary peak were observed.

The optical characteristic observed when this device was activated by a 1 μsec, 15 V pulse applied every 1 second is shown in FIG. 18. Although the liquid crystal molecules did reverse into a dark state on voltage application, this state change was slow and the dark state was not satisfactorily stable.

Also, when the device was stood up and used in an upright position, liquid crystal material collected at the lower portions of the substrates, areas where the distance between the substrates became large formed, and when the device was pushed with a finger the distance between the substrates at the pushed portion decreased, and along with this the layer structure of the liquid crystal broke down and display blurring occurred.

Embodiment 8

A film of indium tin oxide (ITO) was formed by sputtering or vapor deposition or the like to a thickness of 500–2000 Å, in this embodiment 1000 Å, on 10 cm-square glass substrates, and electrodes were patterned by an ordinary photolithography process. On these substrates, Nissan Chemical Industries, Ltd.'s SE-4110 or SE-610, here SE-4110, was offset printed by a stripe coater and made into an orientation film by baking at 200°–300° C., in this embodiment 280° C. The film thickness was 600°–1000 Å, in this embodiment 800 Å. These substrates were treated in such a way that the rubbing direction would become 90° when the electrode faces were made to face each other, 6.5 μm silica particles were scattered on one of the substrates, a seal material was screen printed on the other substrate, and the two substrates were pasted together to form TN cells.

For the liquid crystal material, cyanobiphenyl-type nematic liquid crystal, whose dielectric anisotropy is positive, was used, and for the resin material a commercially available ultraviolet ray-hardening resin was used, in a ratio of 5% resin with respect to 95% liquid crystal material. In order to better mix the resin throughout the liquid crystal, the mixture was heated at 90° C. until the liquid crystal showed isotropic phase and stirred; this was poured under a vacuum into the cells and after this was gradually cooled the resin was hardened.

The voltage across the liquid crystal layer when a voltage of 10 V was applied to this completed liquid crystal electro-optical device changed sharply and did not change with time. The optical characteristic also changed sharply from a dark state to a bright state along with the voltage change, and did not change with time. Also, even when the device was stood up and used in an upright position the distance between the substrates was maintained constant by the resin and did not become large, and there was no occurrence of display blurring. In a liquid crystal electro-optical device made in this way, display blurring and flickering and the like were not observed and an extremely high-performance device having stable optical characteristics could be made. Also, when a liquid crystal electro-optical device of active matrix type having a plurality of pixel electrodes on the inner surface of one of the substrates and thin film transistors connected to these pixels was made with its cells filled with a liquid crystal mixture of this invention, a device having high speed and high contrast ratios could be obtained.

For comparison a device was made without resin being added to the liquid crystal material. The voltage across the electrodes (across the liquid crystal layer) when a voltage of 10 V was applied to this liquid crystal electro-optical device changed greatly with time, and the optical characteristic also changed along with the change with time of this voltage.

Embodiment 9

A film of indium tin oxide (ITO) was formed by sputtering or vapor deposition or the like to a thickness of 500–2000 Å, in this embodiment 1000 Å, on 10 cm-square glass substrates, and electrodes were patterned by an ordinary photolithography process. Polyimide was coated onto these substrates by spin coating and baked at 280° C. As the polyimide, Nissan Chemical Industries, Ltd.'s RN-305, TORAY INDUSTRIES, INC.'s LP-64 were used. The polyimide film thickness was 100–800 Å, and in this embodiment was 150 Å. Uniaxial orientation treatment was carried out on these substrates by rubbing. On one of the substrates, CATALYSTS & CHEMICALS INDUSTRIES CO., LTD.'s Shinshikyu, which are silica particles, were scattered as spacers, and on the other substrate a seal material made of epoxy resin was formed by screen printing. The two substrates were affixed together to form cells, with the distance between their electrodes made about 1.5 μm.

The liquid crystal material that was used in this embodiment was CHISSO CORPORATION's strongly dielectric liquid crystal, CS1014. The Ps (spontaneous polarization) of this liquid crystal is 5.4 nC/cm$^2$, and the phase series is I (isotropic phase) –N (nematic phase) –A (smectic A phase) –C* (smectic C* phase). For the reaction initiator, from among those with which the effects of the invention could best be obtained, Ciba Geigy Co.'s Irugacure 369 was used.

The reaction initiator was added to the liquid crystal to a content of 0.1 to 3%, in this embodiment 3%, and so that the added reaction initiator would mix better throughout the liquid crystal the mixture was heated at 100° C. until the liquid crystal showed isotropic phase and stirred so that the reaction initiator mixed throughout the liquid crystal uniformly. (Hereinafter referred to as the liquid crystal mixture.)

The cells and the liquid crystal mixture were heated to 100° C., and the liquid crystal mixture was poured into the cells under a vacuum. After that the cells were gradually cooled to room temperature at 2° to 20° C./hour, in this embodiment 2° C./hour. When the orientation state at room temperature after the gradual cooling was observed using a polarized light microscope, the resin material was present at points throughout the cells and the orientation of the liquid crystal material was, like that of a liquid crystal material to which reaction initiator has not been added, such that the liquid crystal was uniaxially oriented in the rubbing direction, and good quenching levels were obtained.

When the current-voltage characteristic was measured while a triangular wave of ±20 V, 5 Hz was applied across the electrodes of this liquid crystal electro-optical device and the applied voltage continuously varied, at a certain voltage value such as is shown in FIG. 19 (shown with arbitrary units) only a peak (hereinafter referred to as a Ps peak) where the liquid crystal molecules changed the direction of spontaneous polarization through 180°, in other words reversed, could be observed.

The optical characteristic when this device was activated by a 1 μsec, 15 V pulse applied every 1 second is shown in FIG. 20. As is clear from the graph, it was found that during voltage applications above the Ps peak voltage a bright-dark reversal occurs, a sharp bright-dark state occurs and furthermore this state is stable.

Embodiment 10

In this embodiment, the structure of the device and the liquid crystal material and the reaction initiator are the same as in embodiment 4. However, the amount of reaction initiator added to the liquid crystal is 1%. In order to better mix the added reaction initiator throughout the liquid crystal, as was done in embodiment 9, the mixture was heated at 100° C. until the liquid crystal showed isotropic phase and stirred to mix the reaction initiator uniformly throughout the liquid crystal and make a liquid crystal mixture.

23

The cells and the liquid crystal mixture were heated to 100° C. and the liquid crystal mixture was poured into the cells under a vacuum. After this gradual cooling to room temperature was carried out at 2° to 20° C./hour, in this embodiment 2° C./hour as in embodiment 9. When the orientation state at room temperature after cooling was observed using a polarized light microscope, like a liquid crystal material to which reaction initiator has not been added, liquid crystal was uniaxially oriented in the rubbing direction and good quenching levels were obtained.

When, as was done in embodiment 9, the current-voltage characteristic was measured while a triangular wave of ±20 V, 5 Hz was applied across the electrodes of this liquid crystal electro-optical device, the characteristic was such that, as in the case of embodiment 9, at a certain voltage value such a Ps peak only could be observed.

The optical characteristic observed when this device was activated by a 1 μsec, 15 V pulse applied every 1 second is shown in FIG. 21. As is clear from the graph, although during voltage applications above the Ps peak voltage a bright-dark reversal occurs and the state once becomes a dark state, this state changes with time toward the bright state side.

This device was irradiated with ultraviolet light for further charge supply from the reaction initiator. The strength of the ultraviolet light used here was 20 mW/cm$^2$ and the irradiation duration was 1 minute. When the current-voltage characteristic was observed the Ps peak only was confirmed, as before the irradiation with ultraviolet light. In the optical characteristic a sharp bright-dark reversal occurred as in embodiment 9, and this state did not change with time and was stable.

Embodiment 11

The liquid crystal material that was used in this embodiment was a strongly dielectric liquid crystal of biphenyl type whose Ps is 10.9 nC/cm$^2$ and whose phase series shows I (isotropic phase) –A (smectic A phase) –C* (smectic C* phase). For the reaction initiator, Ciba Geigy Co.'s Irugacure 184 was used, and the amount added was 1% in the liquid crystal material.

In order to better mix the added reaction initiator throughout the liquid crystal, the mixture was heated at 120° C. until the liquid crystal showed isotropic phase and stirred to mix the reaction initiator uniformly throughout the liquid crystal and make a liquid crystal mixture.

Cells of the same structure of those of embodiment 9 were prepared, these cells and the liquid crystal mixture were heated to 120° C. and the liquid crystal mixture was poured into the above-mentioned cells under a vacuum. After this, gradual cooling to room temperature was carried out at 2° to 20° C./hour, in this embodiment 2° C./hour. When the orientation state at room temperature after cooling was observed using a polarized light microscope, like a liquid crystal material to which reaction initiator has not been added, liquid crystal was uniaxially oriented in the rubbing direction of the orientation film, and good quenching levels were obtained.

When the current-voltage characteristic was measured while a triangular wave of ±20 V, 5 Hz was applied across the electrodes of this liquid crystal electro-optical device, as in the embodiment discussed above, at a certain voltage value such a Ps peak only could be observed.

The optical characteristic observed when this device was activated by a 1 μsec, 15 V pulse applied every 1 second is shown in FIG. 22. Although the bright state did reverse into a dark state on voltage application, this dark state changed toward the bright state side with time. Also, this dark state was not of very good quality.

24

This device was irradiated with ultraviolet light for further electric charge supply from the reaction initiator. The strength of the ultraviolet light used here was 20 mW/cm$^2$, and the irradiation duration was 1 minute. When the current-voltage characteristic of this liquid crystal electro-optical device was observed at a certain voltage value similar to that before the irradiation with ultraviolet light, the Ps peak only could be observed.

The optical characteristic observed when this device was activated by a 1 μsec, 15 V pulse applied every 1 second as was done before the ultraviolet light irradiation is shown in FIG. 23. It was found that during voltage applications a bright-dark reversal occurs, land the optical characteristic, especially the dark state, is good and this state is also stable.

Embodiment 12

A film of indium tin oxide (ITO), which is an electrode material, was formed by sputtering or vapor deposition or the like to a thickness of 500°–2000 Å, in this embodiment 1000 Å, on 10 cm-square glass substrates, and electrodes were patterned by an ordinary photolithography process. On these substrates, Nissan Chemical Industries, Ltd.'s SE-4110 or SE-610 was offset printed by a stripe coater and made into an orientation film by baking at 200° to 300° C., in this embodiment 280° C. The film thickness was 600–1000 Å, in this embodiment 800 Å. These substrates were treated in such a way that the rubbing direction would become 90° when the electrode faces were made to face each other, 6.5 μm silica particles were scattered on one of the substrates, a seal material was screen printed on the other substrate, and the two substrates were pasted together to form TN cells.

For the liquid crystal material, cyanobiphenyl-type nematic liquid crystal, whose dielectric anisotropy is positive, was used. For the reaction initiator, 3% of Irugacure 369 was added to the liquid crystal, and, in order to better mix the added reaction initiator throughout the liquid crystal, the mixture was heated at 90° C. until the liquid crystal showed isotropic phase and stirred to mix the reaction initiator uniformly into the liquid crystal and make a liquid crystal mixture which was then was poured into the above-mentioned cells.

The voltage across the liquid crystal layer when a voltage of 10 V was applied to this liquid crystal electro-optical device changed sharply and did not change with time. The optical characteristic also changed sharply from a dark state to a bright state along with the voltage change, and did not change with time.

Comparison Example 1

The structure of the device and the liquid crystal material in this comparison example are the same as those used in embodiments 9 and 10. However, in this comparison example reaction initiator is not added to the liquid crystal material.

The cells and the liquid crystal material were heated to 100° C. and the liquid crystal material was poured into the above-mentioned cells under a vacuum. After this, gradual cooling to room temperature was carried out at 2° to 20° C./hour, in this embodiment 2° C./hour. When the orientation state at room temperature after cooling was observed using a polarized light microscope, the liquid crystal was uniaxially oriented in the rubbing direction and good quenching levels were obtained.

When the current-voltage characteristic of this liquid crystal electro-optical device was measured, as shown in FIG. 24 a Ps peak and a rise and fall in current (hereinafter referred to as a secondary peak), which apparently is a movement in electric charge within the device, were measured. Because this secondary peak normally exists close to the Ps peak, it is difficult to determine the voltage applied during operation of the device.

The optical characteristic observed when a 1 μsec, 15 V pulse was applied every 1 second to this device to activate it is shown in FIG. 25. Although the liquid crystal molecules did reverse into a dark state on voltage application, this dark state unstably changed with time toward the bright state side and after that toward the dark state side again.

Comparison Example 2

The structure of the device and the liquid crystal material in this comparison example are the same as those used in embodiment 11. However, in this comparison example reaction initiator is not added to the liquid crystal material.

In the same way as in embodiment 11, the liquid crystal material was poured into the cells described above. When the current-voltage characteristic of this liquid crystal electro-optical device was measured, a Ps peak and a secondary peak were measured, as in comparison example 1.

The optical characteristic observed when this device was activated by a 1 μsec, 15 V pulse applied every 1 second is shown in FIG. 26. Although the bright-dark state did reverse on voltage application, this state change was slow.

Comparison Example 3

The structure of the device and the liquid crystal material in this comparison example are the same as those used in embodiment 12. However, in this comparison example reaction initiator is not added to the liquid crystal material. The liquid crystal material was poured in the same way as in embodiment 12.

The voltage across the liquid crystal layer when a voltage of 10 V was applied to this liquid crystal electro-optical device changed with time, and the optical characteristic also changed along with this change with time in the voltage.

A described in detail above, by using a resin material as in this invention, it is possible to adhere upper and lower substrates together in a column form. By this it is possible to reliably maintain the distance between the substrates, which has been a problem especially in liquid crystal electro-optical devices of large surface area, collapsing of the layer structure of the liquid crystal and display blurring, etc, can be suppressed, and it becomes possible to stand a device up and use it in an upright position.

Also, according to this invention, by adding an unhardened resin material, that is a monomer or oligomer, etc, resin structure material and a reaction initiator to a liquid crystal material, it was possible to positively cancel the electric charges within the device that have been a problem in conventional liquid crystal electro-optical devices. As a result, it is possible to eliminate instability of the state of the liquid crystal molecules caused by unwanted charges, and stable optical characteristics can be obtained.

By this it was possible to eliminate flickering of the display, variation with time of shades and color tones, and display blurring in a liquid crystal electro-optical device and thereby make a high-performance liquid crystal electro-optical device. Particularly with liquid crystal electro-optical devices in which strongly dielectric liquid crystal is used, in the case of simple matrix types it was possible to increase memory quality, realize higher contrast, and realize higher speeds. In the case of active matrix types and especially TFT-driven types it was possible to realize higher contrast and higher speeds. And also in liquid crystal electro-optical devices in which nematic liquid crystal is used, it was possible to improve contrast ratios and display states, etc.

Furthermore, even with only a reaction initiator being added to the liquid crystal, without a resin structure material being added, it was possible to solve excessive state changes in the liquid crystal molecules caused by electrical charges within the device, which have been a problem in conventional liquid crystal electro-optical devices, by positively canceling the electrical charges themselves existing inside the device with electrical charges from the reaction initiator, and it was possible to stabilize the optical characteristics of the device and obtain a high-performance liquid crystal electro-optical device having no flickering or tone variation, etc, and with which time division drive is possible.

Also, according to this invention, because charges produced by excess canceling, which have been a problem with the conventional use of charge movement complexes, do not occur, long-term optical stability of the device is obtained, and the areas in which this invention contributes to liquid crystal electro-optical device characteristics stability are great.

While the invention has been described in detail and with reference to specific embodiments thereof, it will be apparent to one skilled in the art that various changes and modifications can be made therein without departing from the spirit and scope thereof.

What is claimed is:

1. An electrooptical device comprising:

a pair of substrates assembled in such a manner that a surface of one of said substrates having an electrode thereon may face against a surface of the other of said substrates having an electrode thereon;

an electrooptical modulating layer comprising a mixture of liquid crystal material, cured resin and reaction initiator provided between said pair of substrates;

an orienting means provided on at least one of the surfaces of said substrates to obtain one-direction oriented liquid crystal; and wherein the cured resin is an adhesive resin precipitated inside the said mixture and solidified into a column to adhere said orienting means or said substrates with the adhesive resin.

2. The device of claim 1 wherein area of the adhesive resin accounts for 0.1 to 20% of total area of a display portion of said device as viewed from said substrates of said device.

3. The device of claim 1 wherein said adhesive resin comprises an ultraviolet ray hardening resin.

4. The device of claim 3 further comprising means for absorbing an ultraviolet ray.

5. The device of claim 3 wherein at least one of said substrates absorbs an ultraviolet ray.

6. An electrooptical device comprising:

a pair of substrates assembled in such a manner that a surface of one of said substrates having an electrode thereon may face against a surface of the other of said substrates having an electrode thereon;

an electrooptical modulating layer comprising a liquid crystal material and a precipitated, cured polymer provided between said pair of substrates, said polymer extending between said pair of substrates in a columnar shape; and at least one polarizing plate provided on at least one of said substrates, wherein said liquid crystal material contains a reaction initiator.

7. The device of claim 6 further comprising an orienting means provided on at least one of the surfaces of said substrates to obtain one-direction oriented liquid crystal.

8. The device of claim 7 wherein said electrooptical modulating layer further comprises an adhesive resin.

9. The device of claim 8 wherein said adhesive resin comprises an ultraviolet ray hardening resin.

10. The device of claim 9 further comprising means for absorbing an ultraviolet ray.

11. The device of claim 9 wherein at least one of said substrates absorbs an ultraviolet ray.

12. The device of claim 6 wherein said reaction initiator accounts for 0.001 to 10% of said liquid crystal material.

13. The device of claim 6 wherein said reaction initiator is cleaved by an ultraviolet ray.

14. The device of claim 6 wherein said liquid crystal material comprises a material selected from the group consisting of ferroelectric liquid crystal, antiferroelectric liquid crystal and nematic liquid crystal.

15. The device of claim 6 further comprising a thin film transistor provided on one of said substrates.

16. A process for fabricating an electro-optical device comprising:

preparing a mixture of a liquid crystal, a prepolymer and reaction initiator;

introducing said mixture into a space between a pair of substrates;

orienting said liquid crystal between said pair of substrates; and then activating said reaction initiator to polymerize said prepolymer into a columnar shape which fixes to respective inside surfaces of said substrates.

17. The process of claim 16 wherein said mixture further comprises an organic resin.

18. The process of claim 17 further comprising the step of separating said liquid crystal material and said reaction initiator.

19. The process of claim 17 wherein said organic resin accounts for 0.1 to 20% of said mixture.

20. The process of claim 16 wherein said cleaving step is carried out by an ultraviolet ray irradiation.

21. The device of claim 1 wherein the precipitated, cured polymer in a columnar shape have irregular sizes.

22. The device of claim 1 wherein the precipitated, cured polymer in a columnar shape have differing shapes one from another.

23. A method of manufacturing a liquid crystal device comprising the steps of:

preparing a mixture of a liquid crystal and a curable resin;

introducing said mixture into a space between a pair of substrates;

orientating said liquid crystal between said pair of substrates; and then curing said resin so that said resin is formed into a columnar shape which fixes to respective inside surfaces of said substrates.

24. The method of claim 23, wherein at least one of said pair of substrates has a an orientation control surface.

25. A method of manufacturing a liquid crystal device comprising the following sequential steps of:

preparing a mixture of a liquid crystal and a curable resin;

introducing said mixture into a space between a pair of substrates, at least one of said substrates having an orientation control surface wherein said mixture is maintained at a temperature at which said liquid crystal exhibits an isotropic phase during introducing;

cooling said mixture so that said liquid crystal is oriented in accordance with said orientation control surface;

curing said resin so that said resin is formed into a columnar shape which fixes to respective inside surfaces of said substrates.

* * * * *